US012320068B1

(12) United States Patent
Dag et al.

(10) Patent No.: US 12,320,068 B1
(45) Date of Patent: Jun. 3, 2025

(54) 3D PRINTED TOOLING FOR PULP MOLDING PROCESS

(71) Applicant: PAPACKS SALES GMBH, Cologne (DE)

(72) Inventors: Tahsin Dag, Cologne (DE); Florian Barth, Cologne (DE)

(73) Assignee: PAPACKS SALES GMBH, Cologne (DE)

( * ) Notice: Subject to any disclaimer, the term of this patent is extended or adjusted under 35 U.S.C. 154(b) by 0 days.

(21) Appl. No.: 18/431,451

(22) Filed: Feb. 2, 2024

(51) Int. Cl.
| | |
|---|---|
| *D21F 13/00* | (2006.01) |
| *B29C 64/118* | (2017.01) |
| *B29D 24/00* | (2006.01) |
| *B29L 31/00* | (2006.01) |
| *B33Y 10/00* | (2015.01) |
| *B33Y 80/00* | (2015.01) |
| *D21J 5/00* | (2006.01) |

(52) U.S. Cl.
CPC ............ *D21F 13/00* (2013.01); *B29C 64/118* (2017.08); *B29D 24/005* (2013.01); *B33Y 10/00* (2014.12); *B33Y 80/00* (2014.12); *D21J 5/00* (2013.01); *B29L 2031/757* (2013.01)

(58) Field of Classification Search
CPC ................. B29C 64/118; B29D 24/005; B29L 2031/757; B33Y 10/00; B33Y 80/00
See application file for complete search history.

(56) References Cited

U.S. PATENT DOCUMENTS

| | | | |
|---|---|---|---|
| 6,261,493 B1 | 7/2001 | Gaylo et al. | |
| 10,040,249 B2 | 8/2018 | Kraibühler et al. | |
| 11,752,688 B2 | 9/2023 | Sealey, II et al. | |
| 2022/0403604 A1 | 12/2022 | Andersson et al. | |

(Continued)

FOREIGN PATENT DOCUMENTS

| | | | | |
|---|---|---|---|---|
| DE | 102019120854 A1 | 10/2021 | | |
| DE | 102022130089 A1 * | 5/2024 | ........... | B29C 64/386 |

(Continued)

OTHER PUBLICATIONS

English translation of DE102022130089A1 retrieved from Espacenet (Year: 2024).*

(Continued)

*Primary Examiner* — Jacob T Minskey
*Assistant Examiner* — Elisa H Vera
(74) *Attorney, Agent, or Firm* — NEO IP

(57) ABSTRACT

The present invention is directed to a 3D printed mold for creating three dimensional pulp products from a fibrous pulp slurry. Transverse filaments are integrated into an infill structure with an open-cell pattern. The transverse filaments form channels through the interior matrix of the mold. The open cell infill pattern and channels allow for the movement of vacuumed materials through the interior matrix of the 3D printed mold when vacuum pressure is applied. The product surface of the mold comprises an array of beads formed from the over-extrusion of melted material at the ends of the transverse filaments. The beaded array narrows the opening of the channels created by the transverse filaments, prevent- (Continued)

ing the fibers from entering the matrix of the mold and clogging the flow of materials. This causes the fibers to aggregate on the product surface of the mold, forming the three dimensional pulp product.

9 Claims, 12 Drawing Sheets

(56) References Cited

U.S. PATENT DOCUMENTS

| | | |
|---|---|---|
| 2023/0107827 A1 | 4/2023 | Briden et al. |
| 2023/0166446 A1 | 11/2023 | Brent, Jr. et al. |
| 2023/0364831 A1* | 11/2023 | Goldberg ............ B29C 33/3814 |

FOREIGN PATENT DOCUMENTS

| | | |
|---|---|---|
| EP | 0852760 B1 | 12/2002 |
| WO | 2022072555 A1 | 4/2022 |
| WO | 2023064797 A1 | 4/2023 |

OTHER PUBLICATIONS

Shaqour, B., Abuabiah, M., Abdel-Fattah, S. et al. Gaining a better understanding of the extrusion process in fused filament fabrication 3D printing: a review. Int J Adv Manuf Technol 114, 1279-1291 (2021). https://doi.org/10.1007/s00170-021-06918-6.

* cited by examiner

3D PRINTED TOOLING FOR PULP MOLDING PROCESS

BACKGROUND OF THE INVENTION

1. Field of the Invention

The present invention relates to tooling and molds for forming three-dimensional (3D) objects, and more specifically to tooling for vacuum forming a pulp product formed from an additive manufacturing process (i.e., 3D printed).

2. Description of the Prior Art

It is generally known in the prior art to provide 3D printed molds for vacuum forming objects.

Prior art patent documents include the following:

US Patent Pub. No. 2022/0403604 for Tool or tool part, system including such a tool or tool part, method of producing such a tool or tool part and method of molding a product from a pulp slurry by inventors Andersson et al., filed Jun. 22, 2022 and published Dec. 22, 2022, is directed to a tool or tool part for use in a process of molding a product from a pulp slurry. The tool or tool part comprises a self-supporting tool wall portion having a product face, for contacting the product, and a back face on the other side of the wall relative to the product face. The tool wall portion presenting pores, which are provided by a plurality of channels extending through the tool wall portion, from the product face to the back face. The channels are straight or curved with no more than one point of inflection.

US Patent Pub. No. 2023/0107827 for Porous sections with partially-fused build material particles by inventors Briden et al., filed Sep. 7, 2022 and published Apr. 6, 2023, is directed to an apparatus which may include a plurality of structures formed of fused sections of build material particles and a plurality of porous sections supported by the plurality of structures. The plurality of porous sections may be formed of partially-fused build material particles, in which the partially-fused build material particles may include build material particles that may be partially fused together to cause the plurality of porous sections to have at least a predefined porosity level.

U.S. Pat. No. 11,752,688 for Manufacturing process for papermaking belts using 3D printing technology by inventors Sealey et al., filed Apr. 30, 2020 and issued Sep. 12, 2023, is directed to a papermaking belt including zones of material laid down successively using a 3D printing process. The zones include at least a pocket zone configured to form three dimensional structures in a paper web by applying vacuum to pull the paper web against the pocket zone. In at least one exemplary embodiment, the zone also include at least one vacuum breaking zone configured to limit an amount of paper fibers pulled through the pocket zone by the applied vacuum.

U.S. Pat. No. 10,040,249 for Method for producing a three-dimensional object by means of generative construction by inventors Kraibühler et al., filed Aug. 26, 2015 and issued Aug. 7, 2018, is directed to a method for producing a three-dimensional object by means of generative construction in a direct constructional sequence from at least one solidifiable material. At least one material component is discharged in a programmable way via a control device in the direct constructional sequence and, as a result of the discharge, produces structurally different regions of the object that are joined together, wherein geometric relationships obtained during the discharge already correspond to the object. The fact that configuration criteria for the structurally different regions of the object are predefined to the control device by using a selection, and that the discharge unit is controlled by the control device during the discharge of the at least one material component for the structurally different regions of the object by using the selected configuration criteria in order to configure a three-dimensional structure desired for the respective region of the object, means that a method is provided by means of which the discharge of the material can be carried out in accordance with individual requirements on the object.

US Patent Pub. No. 2023/0166446 for Methods of making a deflection member by inventors Brent et al., filed Jan. 27, 2023 and published Jun. 1, 2023, is directed to a method for manufacturing a deflection member. The method may include the step of incorporating a monomer, a photoinitiator system, a photoinhibitor, and/or a reinforcing member. A further step includes blending the monomer, photoinitiator, and/or photoinhibitor to form a blended photopolymer resin. Further steps may be exposing the photopolymer resin to radiation form a first radiation source and/or a second radiation source.

U.S. Pat. No. 6,261,493 for Fabrication of tissue products with additives by casting or molding using a mold formed by solid free-form methods by inventors Gaylo et al., filed Mar. 20, 1998 and issued Jul. 17, 2001, is directed to a method and system for molding a tissue or substitute tissue product in a mold having an exterior surface, and an interior surface, wherein at least one portion of the interior surface is porous and whose pores are in continuous communication with the exterior surface, and wherein said mold can be fabricated using solid free-form fabrication techniques.

EP U.S. Pat. No. 852,760 for Method of making a three-dimensional model with controlled porosity by inventor Batchelder, filed Sep. 17, 1996 and issued Dec. 4, 2002, is directed to a method of making a three dimensional object by depositing material in a predetermined pattern on a receiving surface, and introducing a predetermined porosity into the object being formed by positioning the deposited material so as to introduce pockets of air or other fluid into the part, and by adjusting the rate at which the material is dispensed from the dispenser. Optimal porosities in the object to be built depend upon the shape of the material when it is dispensed, but range generally from 1% to 26%.

WO Patent Pub. No. 2022/072555 for Porous molds for molded fiber part manufacturing and method for additive manufacturing of same by inventors Goldberg et al., filed Sep. 29, 2021 and published Apr. 7, 2022, is directed to systems and methods for creating porous molds using additive manufacturing processes such as three-dimensional (3D) printing. At a high level, it has been found that creating a generally porous mold, or a mold with porous regions or zones, can improve the performance of the mold and the quality of the parts created therefrom. It has further been determined that porous molds can be created using additive manufacturing techniques through manipulation of mold manufacturing parameters such as, but not limited to, layer thickness, number of perimeter layers, fill pattern, and fill density. Through variation of these manufacturing parameters, the porosity of a mold created by an additive manufacturing device, e.g., a 3D printer, can be tailored for use with molded fiber.

WO Patent Pub. No. 2023/064797 for Multiaxis *3d* printing of porous molds for molded fiber part manufacturing by inventors Goldberg et al., filed Oct. 12, 2022 and published Apr. 20, 2023, is directed to a method of making 3D printed porous mold or filters are disclosed in which the external surface of the mold/filter is formed by a single printed layer of material. Supporting layers are then laid down on the surface layer in way that creates a porous body that of substantially uniform porosity across the entire mold/filter surface. Use of such porous bodies as screens on molds for the manufacture of molded fiber parts are described as well as general uses as filters having 3D exterior surfaces.

SUMMARY OF THE INVENTION

The present invention relates to porous, 3D printed molds for vacuum-forming three-dimensional objects from an aqueous pulp slurry.

It is an object of this invention to provide porous tooling for the formation of three-dimensional objects. The tooling is specifically designed to prevent the ingress of fibers into the 3D printed mold component during negative pressurization.

In one embodiment, the present invention includes a mold created using additive manufacturing techniques, comprising a product surface and an interior matrix, at least one transverse polymer layer, and at least one infill polymer layer, wherein the at least one transverse polymer layer comprises a plurality of adjacent columns of superimposed filaments, wherein a dot is over-extruded at a product surface facing end of each of the superimposed filaments, wherein the product surface of the mold comprises a plurality of pores formed between dots of adjacent columns of superimposed filaments, wherein the pores are configured to prevent the ingress of a fiber into the interior matrix of the mold, and wherein an infill polymer layer is deposited on the at least one transverse polymer layer.

In another embodiment, the present invention includes an additive manufacturing method for creating vacuum forming molds, comprising depositing an initial transverse filament, wherein a dot is over-extruded at an end of the initial transverse filament, depositing at least one additional transverse filament on top of the initial transverse filament, wherein an additional dot is over-extruded at an end of the additional transverse filament, depositing at least one adjacent transverse filament column comprising a layer of superimposed transverse filaments adjacent to the initial transverse filament and the at least one additional transverse filament, wherein superimposed dots are extruded at an end of each of the superimposed transverse filament in the at least one adjacent transverse filament column, and depositing an infill polymer layer on top of the at least one additional transverse filament and the at least one adjacent transverse filament column, wherein the at least one infill polymer layer stabilizes the initial transverse filament, the at least one additional transverse filament, and the at least one adjacent transverse filament column.

In a third embodiment, the present invention includes a system for molding a pulp fiber product, comprising a mold comprising a product surface and a back surface, wherein the mold is created using an additive manufacturing process, a vacuum system coupled to the mold, and a pulp slurry comprising natural fibers, wherein an infill polymer layer is deposited on top of a first transverse polymer layer, wherein the first transverse polymer layer comprises a first plurality of adjacent columns of superimposed filaments, wherein at least one additional transverse polymer layer is deposited on top of the infill polymer layer, wherein the at least one additional transverse polymer layer comprises an additional plurality of adjacent columns of superimposed filaments, wherein a dot is over-extruded at a product surface facing end of each of the superimposed filaments, wherein the product surface of the mold comprises a plurality of pores formed between dots of adjacent columns of superimposed filaments, wherein the pores are configured to prevent the ingress of a fiber into the interior matrix of the mold, wherein the product surface of the mold contacts the pulp slurry, wherein negative pressure is applied to the mold by the vacuum system coupled to the mold, and where the natural fibers of the pulp slurry aggregate on the product surface of the mold, forming a molded pulp product.

In yet another embodiment, the present invention includes a method of creating a molded fiber product, comprising forming a mold via additive manufacturing process, the steps comprising, depositing adjacent transverse filaments, wherein a dot is over-extruded at a product surface facing end of each of the adjacent transverse filaments, depositing at least one additional transverse filament on top of the initial transverse filament, wherein an additional dot is over-extruded at a product surface facing end of the at least one additional transverse filament, forming a series of adjacent columns of superimposed transverse filaments, depositing an infill polymer layer on top of the at least one additional transverse filament, wherein the at least one infill polymer layer stabilizes the initial transverse filament and the at least one additional transverse filament, forming a product surface of the mold, wherein the product surface of the mold comprises a plurality of pores formed between dots extruded at the end of adjacent filaments, and forming a back surface of the mold, and submerging the mold in a pulp slurry, wherein the mold is coupled to a vacuum system, wherein the vacuum system applies negative pressure through an interior matrix of the mold to the product surface These and other aspects of the present invention will become apparent to those skilled in the art after a reading of the following description of the preferred embodiment when considered with the drawings, as they support the claimed invention.

DETAILED DESCRIPTION

Figure 1A:
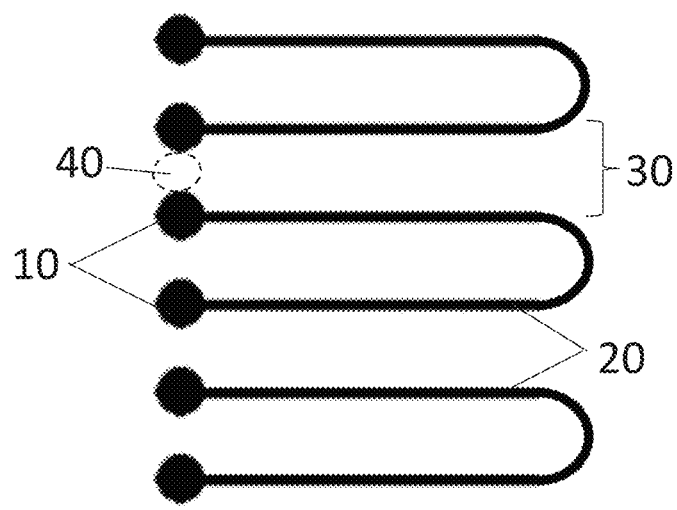
FIG. 1A illustrates an orthogonal top view of a series of transverse filaments according to one embodiment of the present invention.
Figure 1B:
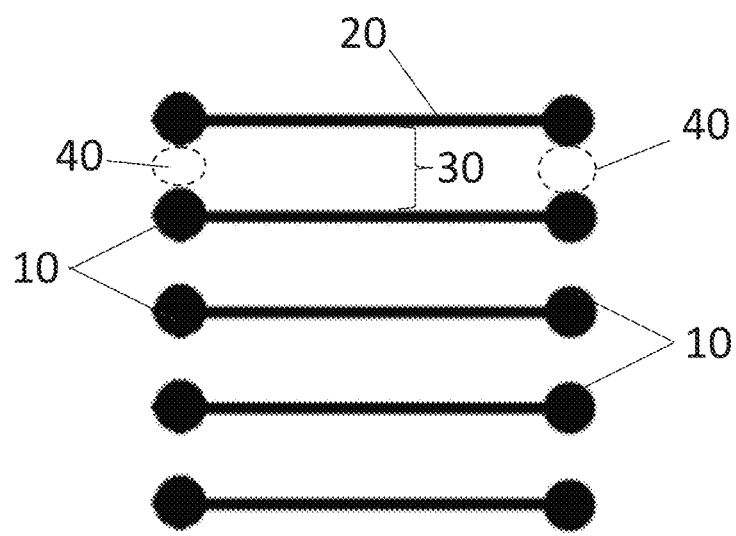
FIG. 1B illustrates an orthogonal top view of a series of transverse filaments according to one embodiment of the present invention.

The present invention is generally directed to porous, 3D printed molds for vacuum-forming three-dimensional objects from an aqueous pulp slurry. The tooling is designed with an open-cell infill structure and a beaded shell. The beaded shell is formed by multiple, deliberately placed z-scar dots to prevent the ingress of fibers into the 3D printed mold component during negative pressurization.

In one embodiment, the present invention includes a mold created using additive manufacturing techniques, comprising a product surface and an interior matrix, at least one transverse polymer layer, and at least one infill polymer layer, wherein the at least one transverse polymer layer comprises a plurality of adjacent columns of superimposed filaments, wherein a dot is over-extruded at a product surface facing end of each of the superimposed filaments, wherein the product surface of the mold comprises a plurality of pores formed between dots of adjacent columns of superimposed filaments, wherein the pores are configured to prevent the ingress of a fiber into the interior matrix of the mold, and wherein an infill polymer layer is deposited on the at least one transverse polymer layer.

In another embodiment, the present invention includes an additive manufacturing method for creating vacuum forming molds, comprising depositing an initial transverse filament, wherein a dot is over-extruded at an end of the initial transverse filament, depositing at least one additional transverse filament on top of the initial transverse filament, wherein an additional dot is over-extruded at an end of the additional transverse filament, depositing at least one adjacent transverse filament column comprising a layer of superimposed filaments adjacent to the initial transverse filament and the at least one additional transverse filament, wherein superimposed dots are extruded at an end of each of the superimposed transverse filament in the at least one adjacent transverse filament column, and depositing an infill polymer layer on top of the at least one additional transverse filament and the at least one adjacent transverse filament column, wherein the at least one infill polymer layer stabilizes the initial transverse filament, the at least one additional transverse filament, and the at least one adjacent transverse filament column.

In a third embodiment, the present invention includes a system for molding a pulp fiber product, comprising a mold comprising a product surface and a back surface, wherein the mold is created using an additive manufacturing process, a vacuum system coupled to the mold, and a pulp slurry comprising natural fibers, wherein an infill polymer layer is deposited on top of a first transverse polymer layer, wherein the first transverse polymer layer comprises a first plurality of adjacent columns of superimposed polymer filaments, wherein at least one additional transverse polymer layer is deposited on top of the infill polymer layer, wherein the at least one additional transverse polymer layer comprises an additional plurality of adjacent columns of superimposed filaments, wherein a dot is over-extruded at a product surface facing end of each of the superimposed filaments, wherein the product surface of the mold comprises a plurality of pores formed between dots of adjacent columns of superimposed filaments, wherein the pores are configured to prevent the ingress of a fiber into the interior matrix of the mold, wherein the product surface of the mold contacts the pulp slurry, wherein negative pressure is applied to the mold by the vacuum system coupled to the mold, and where the natural fibers of the pulp slurry aggregate on the product surface of the mold, forming a molded pulp product.

In yet another embodiment, the present invention includes a method of creating a molded fiber product, comprising forming a mold via additive manufacturing process, the steps comprising, depositing adjacent transverse filaments, wherein a dot is over-extruded at a product surface facing end of each of the adjacent transverse filaments, depositing at least one additional transverse filament on top of the initial transverse filament, wherein an additional dot is over-extruded at a product surface facing end of the at least one additional transverse filament, forming a series of adjacent columns of superimposed transverse filaments, depositing an infill polymer layer on top of the at least one additional transverse filament, wherein the at least one infill polymer layer stabilizes the initial transverse filament and the at least one additional transverse filament, forming a product surface of the mold, wherein the product surface of the mold comprises a plurality of pores formed between dots extruded at the end of adjacent filaments, and forming a back surface of the mold, and submerging the mold in a pulp slurry, wherein the mold is coupled to a vacuum system, wherein the vacuum system applies negative pressure through an interior matrix of the mold to the product surface.

None of the prior art discloses the use of an intentionally placed blob array on the product surface of the 3D printed component, wherein each blob is deliberately placed and connected to a transverse filament. The product surface of a mold is a surface of the mold that contacts the deposited pulp layer that forms the product. Further, none of the prior art discloses transverse filaments stemming from a blob which are parallel and woven into an infill structure to form a 3D printed mold with a product surface with pores that are significantly smaller than the open cell structure formed by the infill components, which may narrow again at an opposite end of a filament due to the use of filaments with beads placed at both ends of the transverse filament. Notably, in one embodiment the transverse components are substantially parallel and not tapered. The size of the pore formed between the beads is significantly narrow. However, the product surface pore is achieved by the deposition of a 3D printed bead on the product surface of the mold rather than tapering the distance between two transverse filaments. Thus, the present invention is able to achieve a narrower aperture on the product surface for entering the mold matrix in comparison to the channels of the prior art formed by tapered transverse filaments.

Three-dimensional printing, or 3D printing, has been around for over forty years. The concept of additive deposition that has become known as 3D printing encapsulates a number of techniques. One technique is fused deposition modeling (FDM), also known as fused filament fabrication (FFF). This technique utilizes a heated nozzle to melt and place thermoplastic filaments. The melted filaments fused together as they are deposed onto the build surface (i.e., the platform used to support the 3D printed structure during the printing process or a previously placed filament to which a new filament is being fused). Another technique, stereolithography (SLA), uses lasers to direct UV light at a resinous liquid. The photopolymerization initiated by the directed UV laser cures the resin into a hardened structure. Other 3D printing techniques include selective laser sintering (SLS), digital light process (DLP), multi jet fusion (MJF), PolyJet, direct metal laser sintering (DMLS), and electron beam melting (EBM). While the present invention is directed to FDM additive manufacturing, one of ordinary skill in the art will appreciate that analogs of the mold of the present invention are operable to be produced by a variety of additive manufacturing techniques.

The rapid prototyping capabilities of 3D printing makes the process an attractive alternative to traditional tool forming techniques. Traditional techniques require the use of expensive metal materials and implement time consuming production processes to create molds. Three-dimensional printing of molds both reduces the material cost of producing molds and creates lightweight models at a higher rate than traditional mold production processes, such as computer numerical control (CNC) machining, aluminum tool fabrication, welding, etc. Thus, 3D printing is significantly more efficient for mold production than alternative methods.

However, molds created through additive deposition methods according to the prior art lack both horizontal and vertical screens for preventing ingress of the fibers into the mold. Traditional FDM printed molds include a horizontal mold screen (i.e., a mold screen in a single plane formed as material is added to the top of a 3D printed mold). However, the vertical surfaces of such molds printed by traditional methods are not conducive to the formation of pulp products, as there is no method of creating pores on the sides of the 3D printed mold. Rather, the deposition of material onto the horizontal surface of the mold causes a shape to form for thermoforming. For vacuum forming, the opening of a horizontal surface may be used for vacuum suction, but the vertical walls of the 3D printed molds of the prior art are solid, preventing vacuum pressure from being applied through the wall. The present invention provides a single mold with both horizontal and vertical product surfaces.

Notably, additive manufacturing, and particularly FDM, is not a perfect process. The use of melted materials (e.g., thermoplastic materials) in 3D printing often results in the over extrusion of such materials, which are deposited onto the build surface. These over extrusions of filament are referred to as "blobs" "zits" or "z-scars" and are a common occurrence in 3D printing. Blobs occur in many 3D printing techniques but are particularly common in FDM printing. In fused deposition modeling, extruders are used to repeatedly stop and start the deposition of a filament. The sudden cessation of filament deposition causes a buildup of melted material in the nozzle. When the next filament is initiated, this buildup is applied at the beginning of the filament. Blobs may also occur at the end of a filament, where additional melted material is deposited as the nozzle hovers over the end of the filament before moving to the beginning of the next. High nozzle retraction rates (i.e., repeatedly stopping a filament and starting a new filament) lead to the formation of blobs in 3D printed objects. In this way, 3D printed molds of the prior art include irregular, accidental blobs placed throughout the structure. See Shaqour, B., Abuabiah, M., Abdel-Fattah, S. et al. Gaining a better understanding of the extrusion process in fused filament fabrication 3D printing: a review. Int J Adv Manuf Technol 114, 1279-1291 (2021), doi: 10.1007/s00170-021-06918-6, which is incorporated herein by reference in its entirety.

The present invention advantageously utilizes this phenomenon in the creation of a 3D printed mold for vacuum formation of 3D products. Rather than minimize blob formation, as taught by the prior art, one or more of the features of the present invention, and particularly the product surface of the mold, is formed using deliberate placement of over extruded blobs, referred to herein as "beads". The mold of the present invention includes beaded, transverse filaments and an infill structure. Layers and rows of transverse, parallel filaments are printed across and along an infill structure. The purpose of the infill structure is to provide support for the 3D printed mold, while the transverse filaments including beaded ends or segments are used to cause the accumulation of fibers on the mold surface. At one or both ends of each transverse filament, a bead is placed which significantly decreases the size of the channel opening (i.e., the pore). Thus, the product surface (i.e., a surface of the mold which contacts the pulp slurry, on which the fiber pulp is accumulated as disclosed herein) is formed using an array of beads, intentionally placed at one or both ends of a transverse filament in order to reduce the size of the pores on the mold surface. The term "transverse filament" as used herein relates to a filament deposited in a line which crosses a patterned infill structure, either through the interior matrix of the infill structure of the mold or along an exterior surface of the mold. Further, these filaments should not be limited to only filaments placed in a straight line or substantially straight line, but also include those filaments deposited in a line with one or more curves (e.g., a line with repeated crests and troughs) or a spline (e.g., a piecewise polynomial curve).

Further, the mold of the present invention utilizes transverse filaments which are not continuous, thereby limiting the length of 3D printed threads and thereby decrease the number of blobs formed within the transverse filament, as blob production increases as a result of extended extrusion times. The use of repeated transverse filaments, rather than one continuous filament, reduces spontaneous blob formation and allows for the intentional placement of beads at the desired end of the transverse filament. The presence of spontaneously formed blobs within the channels formed by 3D printed molds using continuous filaments and filaments with blobs throughout the channels cause fibers to clog up during the vacuuming of a pulp slurry. The pulp fibers are caught in the narrowed sections of the mold matrix (i.e., the interior of the mold) and are unable to pass through, clogging the mold and preventing further vacuum formation from occurring. This essentially renders the 3D printed mold useless for 3D object formation.

Thus, the manipulation of bead placement is particularly advantageous for the specific field in which the mold is used, which is the vacuum formation of three-dimensional products from an aqueous fiber slurry. The slurry is applied to the product surface of the mold, and negative pressure (i.e., a vacuum) is applied to the slurry through the porous mold. The size of the pores formed by the beads prevents the ingress of fibers into the infill structure of the mold matrix, while allowing fluid to pass through the pores. As the slurry is dewatered, the fibers of the pulp conform to the product surface of the mold but are not able to enter through the pore and thus accumulate on the product surface of the mold.

Referring now to the drawings in general, the illustrations are for the purpose of describing one or more preferred embodiments of the invention and are not intended to limit the invention thereto.

FIGS. 1A-2C illustrate the 3D printed structural design elements of a mold according to embodiments of the present invention. FIGS. 1A-1C illustrate a top view of series of transverse filaments according to embodiments of the present invention. The bead 10 is formed on one or both ends of the transverse filament 20. The channel 30 formed between adjacent transverse filaments 20 includes a product surface pore 40 that is formed at the one end of the channel 30 where the pulp fibers forming the product are deposited. One of ordinary skill in the art will appreciate that the transvers filaments of the present invention are operable to be curved such that a single printed filament forms two adjacent transverse filaments, as depicted in FIG. 1A. Additionally, one of ordinary skill in the art will appreciate that, in one embodiment, curved sections of a 3D printed mold necessitate the use of angled transverse filaments. FIG. 1C illustrates angled, transverse filament 20 with a bead 10 formed at both ends of the filament 20. The channel 30 formed between adjacent filaments 20 includes a product surface pore 40 at the one end of the channel 30, and back surface pore 42 at the opposite end of the channel. As used herein, the term "back surface" refers to a surface of the mold which is not in contact with the pulp slurry during formation of a product. FIG. 1D illustrates a perspective view of a series of transverse filaments according to one embodiment of the present invention. Angled, transverse filaments 20 are layered, bonded together by the bead 10 formed at both ends of the filament 20. In one embodiment, the transverse filaments are also bonded together along the length of the filament. The channel 30 formed between adjacent filaments 20 includes a product surface pore 40 at the one end of the channel 30, and back surface pore 42 at the opposite end of the channel.

In one embodiment, the transverse filaments of the present invention are not continuous. Rather, these filaments are repeated, transverse, parallel, and discontinuous. For the avoidance of doubt, the use of the term continuous as used herein with respect to the transverse filament is understood to mean extended filament lengths which are placed in a back-and-forth or "S" pattern without the nozzle becoming static or the filament deposition ceasing. Continuous filament deposition of transverse filaments includes the placement of three or more transverse filaments, creating a mold which lacks a channel which opens to both the product surface of the mold and the back surface of the mold. Conversely, the discontinuous transverse filaments are placed in either a unidirectional manner, including a starting point on a product surface and a finishing point on a back surface, or a segmented, bidirectional manner, including a starting point and an adjacent finishing point on a product surface, creating a plurality of "U" shaped filaments. The starting point of each transverse filament (i.e., the bead) has an increased thickness because the 3D printing nozzle is static at these points before being laterally accelerated in order to produce the thin, transverse filament. The use of short burst of extrusions to form transverse filaments prevents the creation of blobs which form during extended periods of extrusion. In this way, the present invention is able to overcome the issue of clogging which is prevalent in 3D printed molds of the prior art due to blobs deposited during the continuous extrusion of transverse filaments. In one embodiment, the finishing point of the transverse filament also includes a bead formed by the static 3D printing nozzle. Thus, the transverse filaments of the present invention are configured to include a bead at one or both ends of the transverse filament.

In one embodiment, the transverse filaments are layered on top of each other to form stacks of transverse filaments. In one embodiment, layered filaments are bonded by the bead at one or both ends of the filament, while the filaments are not bonded along the length of the printed filament. In one embodiment, layered filaments are bonded along the length of the filament. In one embodiment, layered filaments are bonded by both the bead at one or both ends of the filament and along the length of the filament. This layered transverse filament structure allows for the formation of walled channels, useful for allowing vacuumed material to pass through the interior matrix of the 3D printed mold without clogging the mold. This is further made possible by the use of the beaded filaments. The bead is used to prevent the ingress of fibers during vacuum formation and thereby prevent the fibers from clogging the mold.

In one embodiment, the channels are formed between layers of discontinuous transverse filaments. In one embodiment, the channels formed between discontinuous transverse filaments include a product surface pore opening on the product surface of the mold, while the length of the channel has a consistent width. As a result, in one embodiment the openings on the back surface of the mold (i.e., a surface that is not in contact with the pulp slurry during product formation) is identical or significantly similar to the distance between parallel transverse filaments, as depicted in FIG. 1A. In one embodiment, the openings on the back surface of the mold is identical or significantly similar to the aperture of the cells of the infill structure as disclosed herein. In one embodiment, the channels of the present invention are of a constant width. In other words, the channels of the present invention are not tapered, with angled filaments forming a narrow product-facing opening and a wider back-facing opening. Rather, the narrow opening is formed by the intentional beads placed at one or both ends of the transverse filament, while the size of the channel itself is determined by the angle and distance between the transverse filaments. As a result, the back surface pore is not always identical in size to the product surface pore. In one embodiment the openings on the back surface of the mold are smaller (e.g., 0.05 mm smaller, at least 0.1 mm smaller) than the distance between parallel transverse filaments. In one embodiment, a bead is formed both at the beginning of the transverse filament and the end of the transverse filament. In one embodiment, the description of the transverse filaments of the present invention describes both single beaded strands and double-beaded strands. In one embodiment, the second surface pore as described herein forms a product surface. For example, when the shape of the product requires a protrusion into the interior of the mold, both ends of the double-beaded channel are operable to form a product surface for the 3D printed mold protrusion.

Figure 1C:
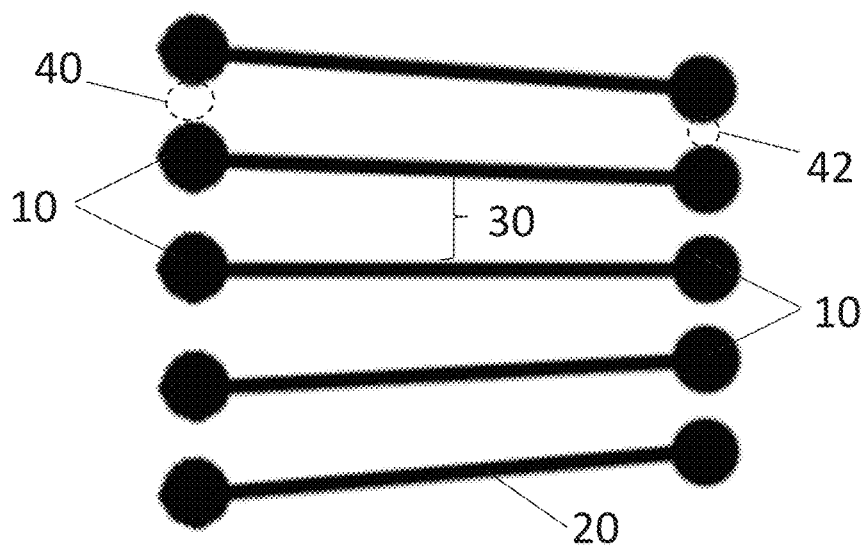
FIG. 1C illustrates an orthogonal top view of a series of transverse filaments according to one embodiment of the present invention.
Figure 1D:
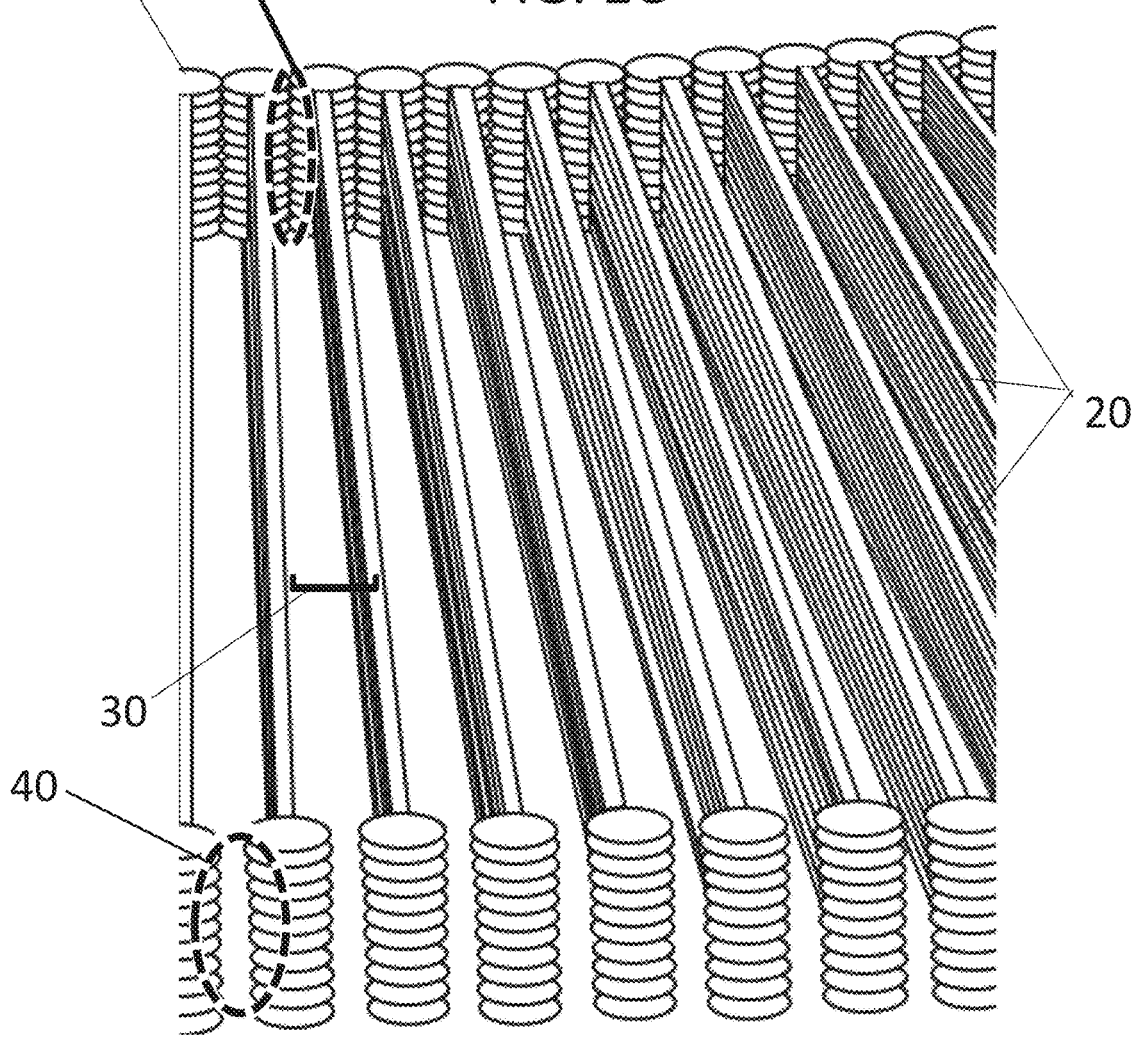
FIG. 1D illustrates a perspective side view of a series of layered transverse filaments according to one embodiment of the present invention.

As disclosed herein, 3D printing allows for the formation of complex shapes and occasionally requires the use of angled transverse filaments to form curves and other convex or concave shapes. The term "angled, transverse filaments" as used herein describes a series of adjacent filaments which are non-parallel due to the trajectory of the filament. However, in one embodiment, these angled filaments are sub-parallel or nearly parallel, with an angle between about 0.01-5 degrees between adjacent filaments. In one embodiment, the transverse filaments of the present invention are angled. FIGS. 1C and 1D illustrate exemplary embodiments of angled transverse filaments according to certain embodiments of the present invention. However, one of ordinary skill in the art will appreciate that the product surface pore (and the back surface pore, for angled, double-beaded filaments) is still formed by the use of a bead to minimize the distance between the end of one filament and the end of an adjacent filament. Thus, in one embodiment, the angle of the angled, transverse filaments is not the determining factor of pore size for the pores of the product facing surface of the mold of the present invention.

In one embodiment, the beads of the present invention are located on one or both distal ends of the transverse filament. At the starting point of each filament, the nozzle remains momentarily static while the next automatic movement is calculated (i.e., a lateral movement to form the body of the transverse filament). As a result, the nozzle over extrudes melted material at the beginning of the transverse filament. Similarly, the nozzle is also prone to over extrusion of melted filament at the end of a movement, as the filament is extruded for the duration of printing the thread and the static pause of the nozzle before moving to the next area of printing causes extra melted material to be extruded. Thus, one of ordinary skill in the art will appreciate that, in one embodiment, the beads of the present invention are significantly different from 3D printed designs where the thickness of the filament has been intentionally increased. In one embodiment, the design of the mold of the present invention uploaded to the 3D printer does not include an area of increased filament deposition at the beginning of each transverse filament. The beads are over extruded filament, the placement of which has been intentionally calculated, though the melted material used to form the bead is not intentionally extruded. Further, one of ordinary skill in the art will appreciate that the beads of the present invention are not placed throughout the transverse filament nor are blobs formed along the length of the transverse filament as a result of over extrusion.

In one embodiment, the beads are located at one end of the transverse filament, forming a beaded product surface with a non-beaded back surface. In one embodiment, the beads are located at both ends of the transverse filament (i.e., a double-beaded filament). The beads produced at both ends of the double-beaded filament form the product surface of the mold, which is useful for molding products which have concavities or convexities along the surface of the molded product. One of ordinary skill in the art will appreciate that where a molded product has a concavity, the mold used to create the product has a corresponding convexity. Similarly, convexities in the surface of the molded product are formed from corresponding concave areas of the mold. For product shapes with concavities and/or convexities, the present invention is operable to utilize double-beaded filaments which transverse the corresponding convexity or concavity of the mold and are beaded at both ends. In this way, the system of the present invention is operable to produce complex mold shapes useful for forming surface features of a molded product. In the vacuum forming process of 3D molded pulp products, an aqueous pulp slurry is applied to the mold (e.g., by submersion of the mold into a vat of the slurry or injection of the slurry into the mold). As negative pressure is applied to the slurry through the channels of the mold, the pulp fibers are vacuumed against the product surface of the mold. The pore formed between the beads on the product surface (i.e. the surface contacting the pulp slurry) prevents the fibers from entering into the channel of the mold. In one embodiment, the size of the pores formed between the beads is such that the ingress of fibers into the channel of the mold is prevented. In one embodiment, the size of the pore formed between the beads is such that the ingress of fibers into the channel of the mold is significantly reduced in comparison to existing molds. In one embodiment, the product surface pore is between about 0.25 mm and about 1 mm. One of ordinary skill in the art will appreciate that the size of the channels and pores of the present invention are operable to be increased or decreased in order to suite the fiber type which is used to make the pulp slurry. For example, fine fibers with a decreased average length and width require a narrower pore size to prevent ingress of the fibers in comparison to fiber blends of large fibers which have an increased average width and thickness than fine fibers. The size of the additive printing nozzle is operable to determine the width of the filaments deposited from the nozzle, as well as the beads formed by the nozzle. In one embodiment, a nozzle with a 0.15 mm diameter deposits filaments with a width of about 0.15 mm and a bead with a width of between about 0.4 to 0.5 mm in diameter.

As used herein, the term "back surface pore" refers to a pore formed by the beads on the back facing surface of the mold. In one embodiment, the back surface pore is formed by the beads of angled, double-beaded filaments, wherein the filament angle causes the pore resulting from one pair of adjacent filaments to be wider than the pore at the other end of the same pair of adjacent filaments. The term back surface pore refers to the pore that is found on the back facing surface of the mold not in contact with the pulp slurry during the production of a pulp product. In one embodiment, the width of the back surface pore is between about 0.25 mm to about 1 mm smaller in comparison to the width of the product surface pore. In one embodiment, the width of the back surface pore is between about 0.25 mm and about 1 mm. In one embodiment, the beads are about 0.5 mm in diameter. In one embodiment, the beads are between about 0.45 mm and 0.85 mm in diameter. In another embodiment, the beads are between about 0.4 to 0.5 mm in diameter.

In one embodiment of the present invention, the transverse, layered filaments form the channels of the mold of the present invention. The channel has an increased width in comparison to the product surface pore formed by the beads. This is due in part to the difference in the thickness of the beads in comparison to the thickness of the transverse filaments. In one embodiment, the transverse filament has a decreased thickness in comparison to the bead formed at one or both ends of the transverse filament. In one embodiment, a transverse filament has a width (i.e., a thickness) of about 0.15 mm. In one embodiment, the width of the transverse filament is between about 0.10 mm and 0.20 mm. In one embodiment, the width of the transverse filament is between about 0.05 mm and 0.25 mm. In one embodiment, the width of the transverse filament is at least about 0.10 mm. In one embodiment, the width of the transverse filament is at least about 0.15 mm. In one embodiment, a transverse filament has a thickness between about 0.1 mm and 0.5 mm.

In one embodiment, the distance between the transverse filaments is about 0.5 mm and 1.5 mm. In one embodiment, the distance between transverse filaments is between about 0.30-0.40 mm. In one embodiment, the distance between transverse filaments is between about 0.20-0.60 mm. In one embodiment, the distance between transverse filaments is between about 0.10-0.70 mm. One of ordinary skill in the art will appreciate that the angle of angular transverse filaments affects the size of the pore of the channels as disclosed herein. In one embodiment the pores formed on the product surface and the back surface of the mold are smaller (e.g., 0.05 mm smaller, at least 0.1 mm smaller) than the distance between parallel transverse filaments at the end of the filament, just before the extruded bead. In one embodiment, the product surface pore is between about 0.30-0.40 mm wide. In one embodiment, the product surface pore is between about 0.20-0.40 mm wide. In one embodiment, the product surface pore is between about 0.10-0.70 mm wide. In one embodiment, the product surface pore is between about 0.30-0.40 mm wide. In one embodiment, the back surface pore is between about 0.20-0.40 mm wide. In one embodiment, the back surface pore is between about 0.10-0.70 mm wide. As the back surface is not designed for contacting the pulp slurry and sucking water into the pores, the pores of the back surface are operable to be completely obstructed during the printing process or at a later stage, e.g. by an additional solid element of the mold.

In one embodiment, if a fiber passes through the product surface formed by the beads, the invasive fiber then enters the channel formed by the transverse filaments. The increased width of the channel in comparison to the pore produced by the beads allows the invasive fiber to pass through the channel of the mold without clogging the channel. The invasive fiber, in one embodiment, passes through the non-beaded back surface of the mold, where it is then vacuumed up with the fluid of the pulp slurry. Further, in one embodiment, the channels formed by the transverse filaments are deposited between layers of an infill structure as disclosed herein and depicted in FIG. 3. The interior matrix of the mold formed by the combination of both transverse filaments and the infill structure directs the invasive fiber and vacuumed fluid through the mold matrix and out through a non-occlusive (e.g., non-beaded) back surface of the mold. Thus, in one embodiment, the channels formed by the transverse filaments are of a sufficient width so as to allow an invasive fiber to pass through unobstructed. Additionally, in one embodiment, the cells of the infill structure of the inner matrix are of a sufficient aperture so as to allow an invasive fiber to pass through unobstructed. In one embodiment, the transverse filament is double-beaded as disclosed herein, forming a channel with pores at both ends. The fluid of the pulp slurry as well as any invasive fibers are vacuumed through the product surface pore(s) and diverted through the matrix of the mold to exit the mold matrix through the cells of the infill structure. That is to say, the fluid of the pulp slurry as well as any invasive fibers are vacuumed through the product surface pores and diverted through the matrix of the mold to exit the mold matrix at a plane that is not parallel to the channel.

In one embodiment, the cells of the one or more infill layers of the inner matrix are of a sufficient aperture so as to allow an invasive fiber to pass through unobstructed while an external infill layer (e.g., an infill layer on a horizontal product surface) has an aperture that is significantly narrow so as to prevent the ingress of fibers. The external infill layer forms a substantially horizontal product surface in addition to the pores formed by the beads of the present invention, which form a product surface with a vertical component. In one embodiment, the mold of the present invention includes multiple external infill layers (e.g., 3 to 5 layers). This advantageously increases the strength of the external product surface, which is configured to cause the aggregation of fibers on the horizontal areas of the product surface As used herein, the terms "horizontal" and "vertical" do not refer to the orientation of the 3D-printed mold in use but the orientation of the printing equipment during production. The 3D printer generally comprises linear drives that move the printing head. Movement of the printing head along the X-axis and the Y-axis define one layer of the printed product. After finishing this layer the printing head is generally moved along the Y-axis to form the next layer. The X-axis and Y-axis define the horizontal plane. The Z-axis defines the vertical direction. The transverse filaments with beads at the end as described herein generally extend in the horizontal plane. Multiple superposed transverse filaments form a stack. The beads at the ends of the filaments of two adjacent stacks form the pore through which liquid from the pulp penetrates. The pores formed by the beads extend in the vertical direction or a direction with a vertical component. It is not possible to form a horizontal pore with superposed beads. Thus, an external infill layer printed in the horizontal plane defined by the X- and Y-axis of the printer with a sufficiently small aperture forms a sieve or grid on the horizontal surface that prevents the ingress of fibers through the grid openings and defines the horizontal product surface. Product surfaces with a vertical component are defined by the beads at the ends of the transverse filaments. The shape of the mold is split up into a multitude of parallel stacks extending in the vertical direction and forming the pores at the end. The internal infill structures extend through the pores between the transverse filaments. The external infill structures form the pores or apertures on the product surfaces without a vertical component, i.e. the horizontal product surfaces.

One of ordinary skill in the art will appreciate that the sufficient width and aperture of the cells of the infill structure of the inner matrix so as to not obstruct an invasive fiber is dependent on several factors, including the orientation of the transverse filaments and the infill structure, the size of the fiber used to form a product, the volume of fiber and fluid which enters the matrix, and the negative pressure exerted on the fiber by the vacuum. Further, the channel width as disclosed herein is narrow enough to allow for the beads of the filaments to form pores that are sufficiently narrow so as to prevent the ingress of fibers into the interior matrix of the mold, while allowing the channel to be wide enough to allow invasive fibers to pass though unobstructed. However, the aperture of the cell is not a factor which determines the size of the product surface pore for vertical product surfaces. Thus, in embodiments of the present invention, the aperture of the infill structure of the inner matrix is operable to be significantly wider than the width of the channels. In one embodiment, the aperture of the cells of the infill structure of the inner matrix are significantly wider than the width of the channels, while a horizontal product surface is formed by an infill layer which has a cell aperture that is similar (e.g., within about 0.1 mm, within about 0.2 mm, within about 0.05 mm) to the size of the product surface pore.

Figure 2A:
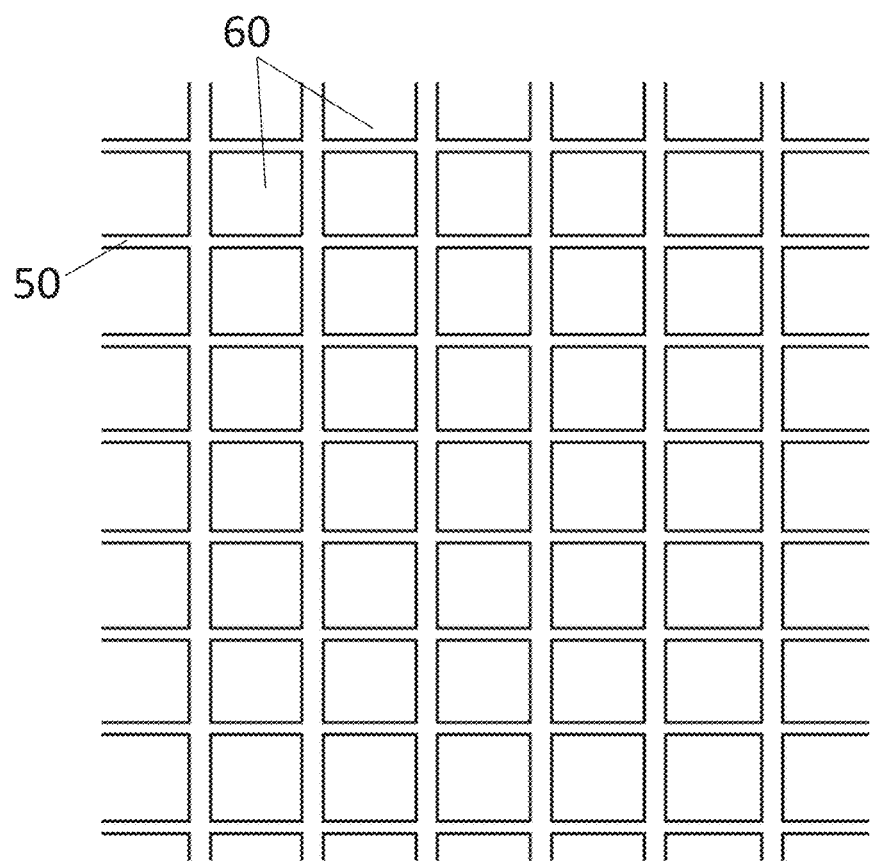
FIG. 2A illustrates orthogonal view of an infill pattern according to one embodiment of the present invention.
Figure 2B:
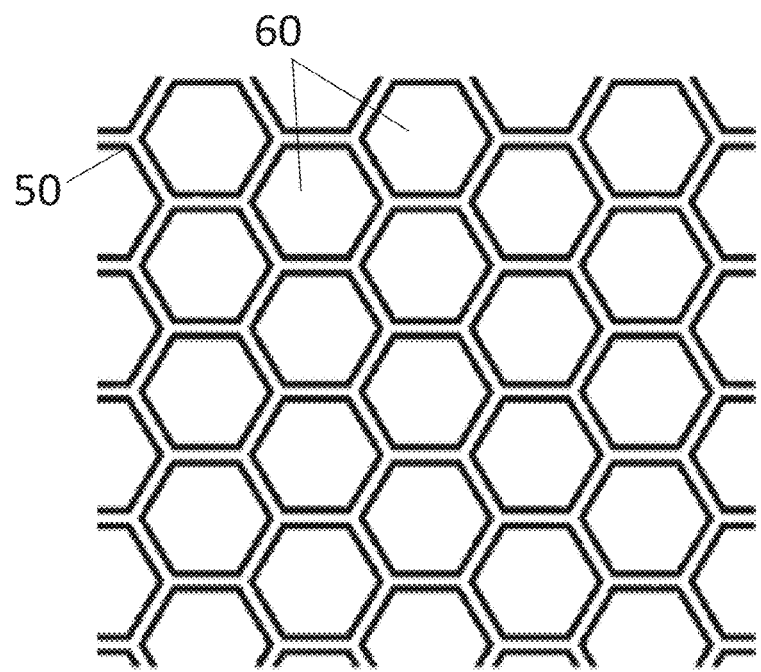
FIG. 2B illustrates orthogonal view of an infill pattern according to one embodiment of the present invention.
Figure 2C:
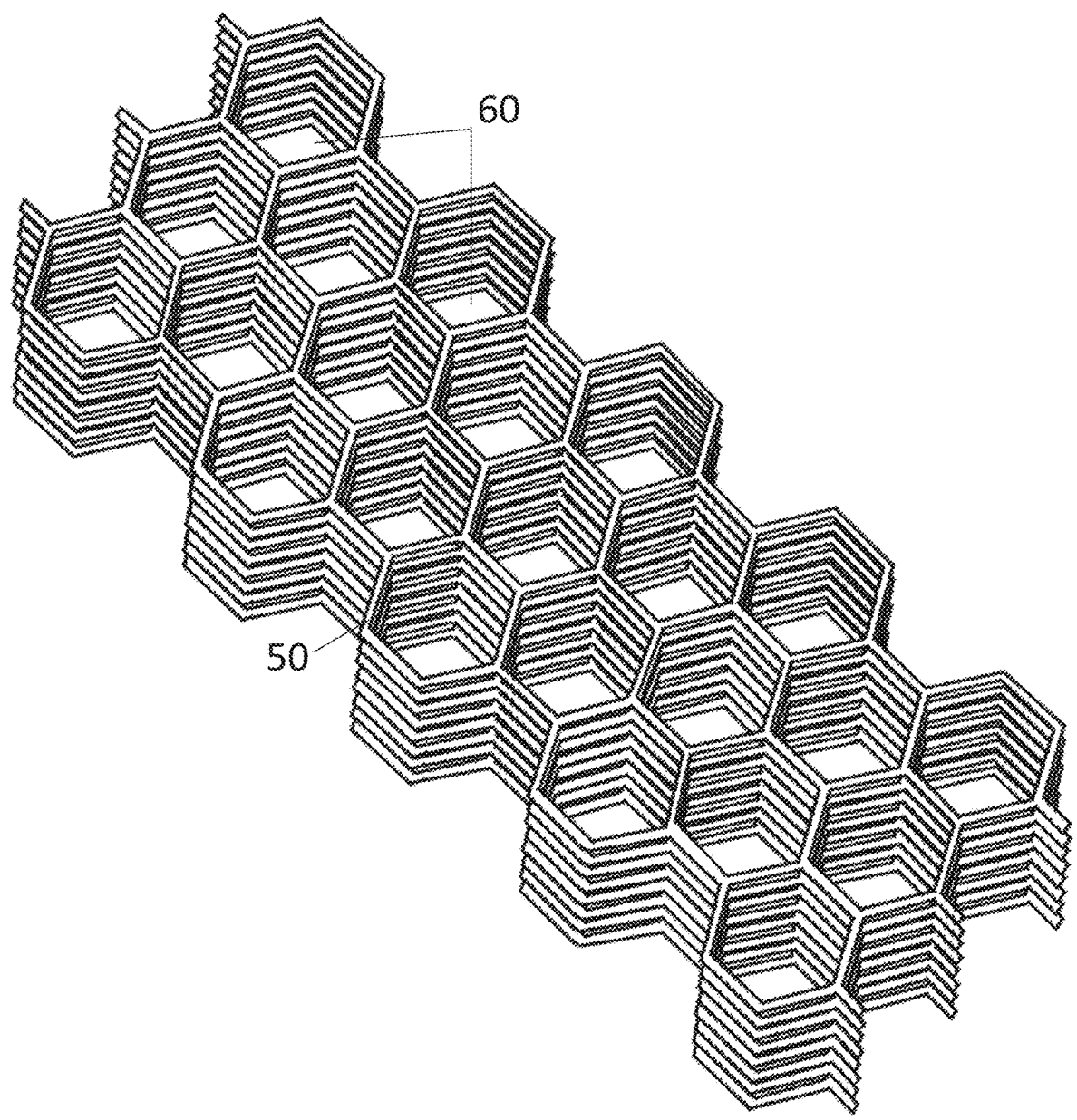
FIG. 2C illustrates a perspective view of a layered infill structure according to one embodiment of the present invention.

FIGS. 2A-2B illustrate an orthogonal view of an infill pattern according to one embodiment of the present invention, while FIG. 2C illustrates a perspective view of a repeated layered infill structure according to one embodiment of the present invention. The infill structure includes infill walls 50 as well as cells 60 formed by the openings of the infill structure. FIG. 2C does not depict the transverse filaments which are deposited between one or more layers of the infill structure.

In one embodiment, the infill structure is a honeycomb structure. In one embodiment, the infill structure is a grid structure. One of ordinary skill in the art will appreciate that the infill pattern is operable to be formed by any 3D printable pattern that contains both an open cell structure and provides sufficient support to the 3D printed mold during the formation of three-dimensional pulp products. Both the honeycomb pattern and the grid pattern provide both increased strength and mechanical resistance capable of supporting the mold during high pressure vacuuming. In one embodiment, the mold is operable to withstand vacuum pressure between about −1 to about −0.6 units of atmospheric pressure (atm). In one embodiment, the mold is operable to withstand vacuum pressure of about-0.8 atm. The infill pattern of the mold is also configured to provide support to the mold during the drying of a molded fiber article within the mold. In one embodiment, the mold is operable to withstand a pressure between about 2 atm to about 6 atm. Examples of alternative infill patterns include but are not limited to a grid pattern, a cubic pattern, an octet pattern, a triangle pattern, a tri-hexagon pattern, a line pattern, a gyroid pattern, a zig zag pattern, a cross pattern, and a concentric pattern.

The layered infill structure supports the transverse filaments of the mold of the present invention, increasing the strength of the mold by adding layers and density to the 3D structure. In one embodiment, the infill structure has an infill density between about 20% and about 50%. In one embodiment, the infill structure has an infill density between about 20% and about 70%. In one embodiment, the infill structure has an infill density between about 35% and about 60%. In one embodiment, the infill structure has an infill density of about 50%. One of ordinary skill in the art will appreciate that increased infill density provides greater strength to a 3D printed mold. The mold must have sufficient strength for minimizing the effect of the negative pressure applied to the mold. However, increasing the density of the infill structure reduces the size of the aperture formed by the cell of the infill structure, thereby minimizing the volume of fluid and invasive material (i.e., fibers which ingress through the product surface pore formed by the beaded filaments) to pass through the interior matrix of the mold. As a result, the reduction in aperture increases the likelihood of clogging (i.e., clogging either by a fiber which was able to pass through the pore or by a buildup of the fluid vacuumed from the slurry). Thus, infill density is an important consideration for some embodiments of the 3D printed mold of the present invention.

In one embodiment, the cells of the infill structure have an aperture between about 0.5 mm and 2 mm. One of ordinary skill in the art will appreciate that, in one embodiment, the aperture of the cells of the infill structure impacts the width of the channel as disclosed herein, in embodiments where both horizontal and vertical product surfaces are used. In such embodiments, the pores formed on the horizontal product surface are determined by the width of the aperture of the cells of the infill structure. Further, in embodiments wherein the inner matrix comprises, at least in part, the infill structure, the aperture of the cells of the infill structure must be of a sufficient width to prevent clogging of the fibers within the matrix (and thus, consideration as to the fiber type may be necessary when determining the size of the cells of the infill structure as well as infill density). Thus, in one embodiment, the aperture of the cells of the infill structure is wider than the channels formed by the transverse filaments.

Figure 3:
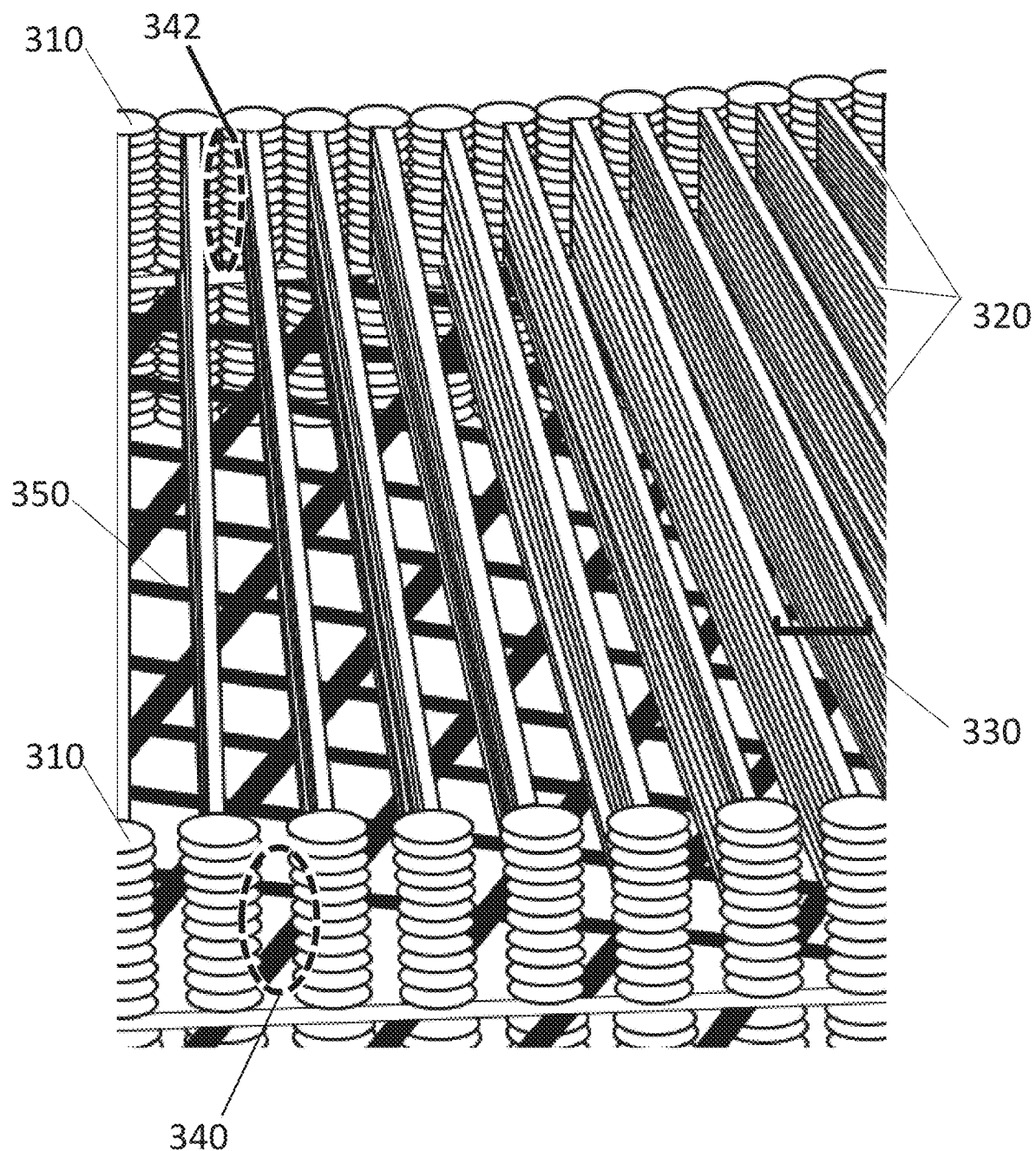
FIG. 3 illustrates a perspective view of a 3D printed design according to one embodiment of the present invention.

FIG. 3 illustrates a 3D printed design structure according to one embodiment of the present invention. The bead 310 is formed at both ends of the transverse filament 320. The channel 330 includes layered transverse filaments 320. The layered filaments 320 are bonded to an infill layer 350. The beads 310 formed on the product surface of the mold create a product surface pore 340 and a back surface pore 342 at the ends of the channel 330 formed by the layered transverse filaments 320. The superposed layered transverse filaments 320 form a stack of material extending transversely through the printed mold. These stacks are stabilized by the infill layers added at regular intervals as disclosed herein.

In one embodiment, the channel of the present invention is formed by the two adjacent stacks formed by layered filaments. The layered filaments form the walls of the channel, preventing lateral movement of fluids and materials vacuumed into the interior matrix of the mold. The insertion of an infill layer at regular intervals provides for a lateral bond between adjacent stacks and thereby stabilizes the 3D printed structure. In one embodiment, a stack of layered filaments between two infill layers contains 2-10 layers (i.e., 2-10 transverse filaments). In one embodiment, a stack of layered filaments between two infill layers contains 5-15 layers. In one embodiment, a stack of layered filaments between two infill layers contains 10-12 layers. In one embodiment, an infill layer is placed at 1 mm intervals between layers of transverse filaments (i.e., the vertical stack between two infill layers is approximately 1 mm tall). One of ordinary skill in the art will appreciate that the number of filament layers used to form each stack between two infill layers is structurally limited, as the layered filaments lack a lateral bond without infill layers.

In one embodiment, an infill layer is printed between stacks of layered filaments. In one embodiment, regular increments of layered filaments are bonded together (i.e., the formation of a stack) with an infill layer printed between the bonded increments. In one embodiment, an infill layer is printed between stacks of layered filaments, creating a gap between stacks that is the same height as the thickness of the infill layer. In one embodiment, the infill layer creates a porous bottom and top surface of the channels formed by the stacks of layered filaments. As disclosed herein, increasing the infill density reduces the size of the aperture formed by the cell of the infill structure. This reduces the rate at which fluid and material are able to pass through the interior matrix of the mold, thereby increasing the likelihood of clogging (i.e., clogging either by a fiber which was able to pass through the pore or by a buildup of the fluid vacuumed from the slurry). Thus, in one embodiment, the infill density of the present invention is between about 20% to about 40%.

In one embodiment, the infill structure has identical, repetitive layers. In one embodiment, adjacent (i.e., two or more layers that are immediately adjacent) identical layers are bonded together. In one embodiment, regular increments of the infill layers (e.g., five layers) are bonded together with at least one transverse filament printed between each bonded increment separating the increments (ex., a first increment of five bonded layers is separated from a second increment of five bonded layers). In one embodiment, each individual layer of the infill structure is separated by one or more transverse filaments printed between unbonded layers. In one embodiment, the transverse filaments that are printed between one or more layers of the infill structure include beads at one end of the filament. In one embodiment, the transverse filaments that are printed between one or more layers of the infill structure include beads at both ends of the filament. In one embodiment, the infill structure at an outer surface of the mold has identical, repetitive layers. These adjacent (i.e., two or more layers that are immediately adjacent) identical layers of the infill structure may be bonded together and increase the strength of the outer surface of the mold that may be subject to mechanical strain and/or that may form the product surface.

Figure 4A:
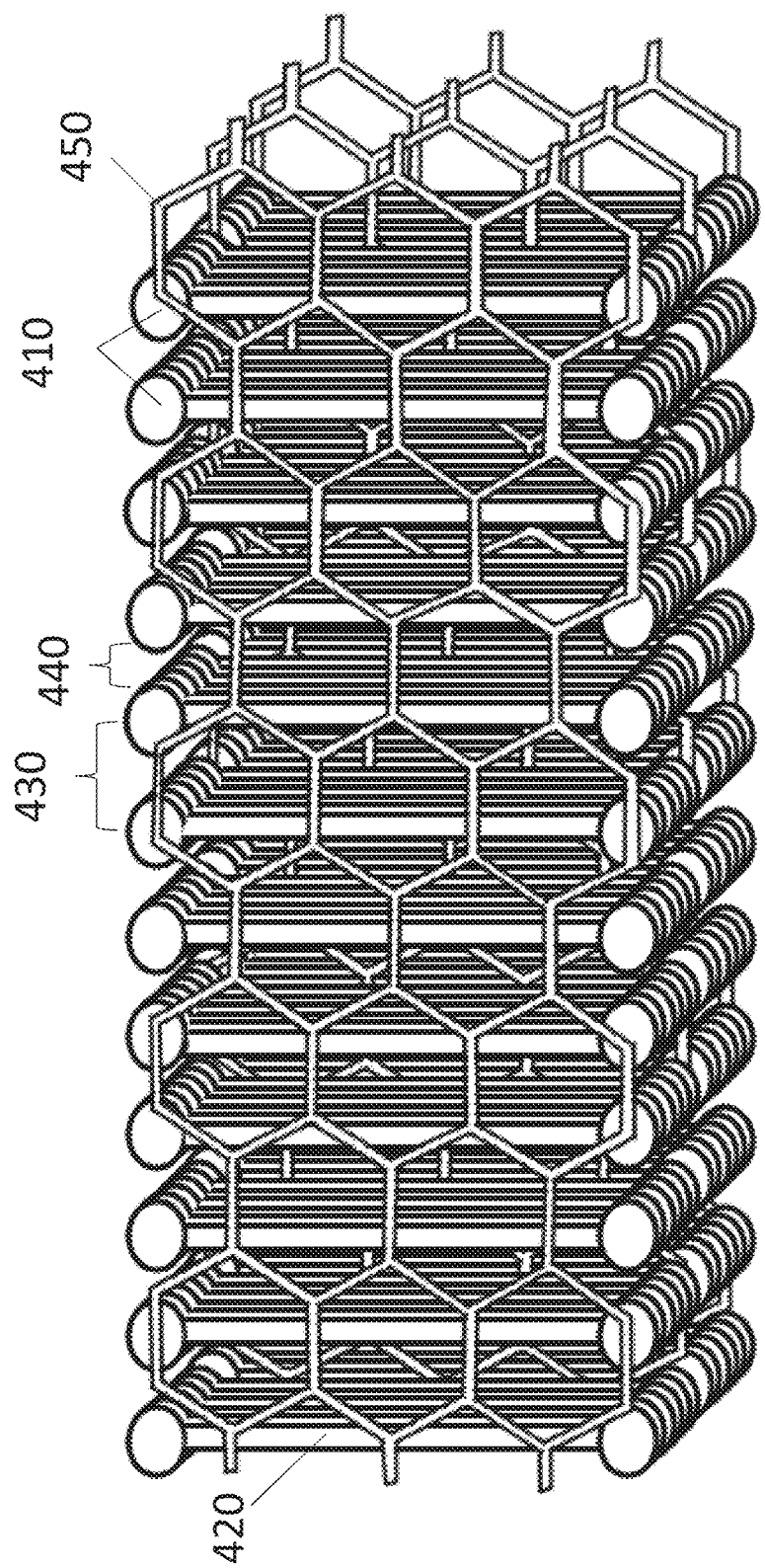
FIG. 4A illustrates a perspective view of the top of a 3D printed design according to one embodiment of the present invention.
Figure 4B:
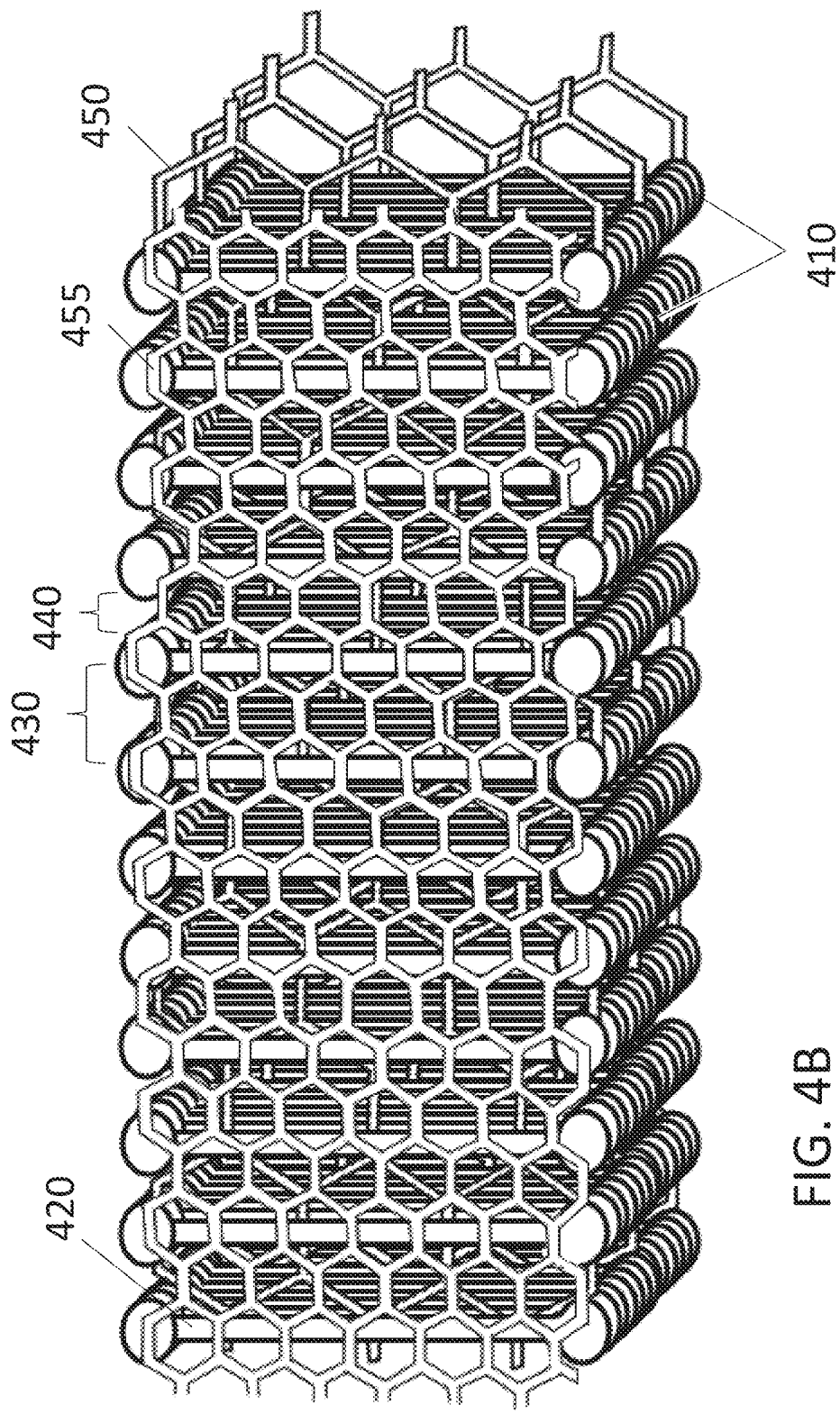
FIG. 4B illustrates a perspective view of a 3D printed design according to one embodiment of the present invention.
Figure 4C:
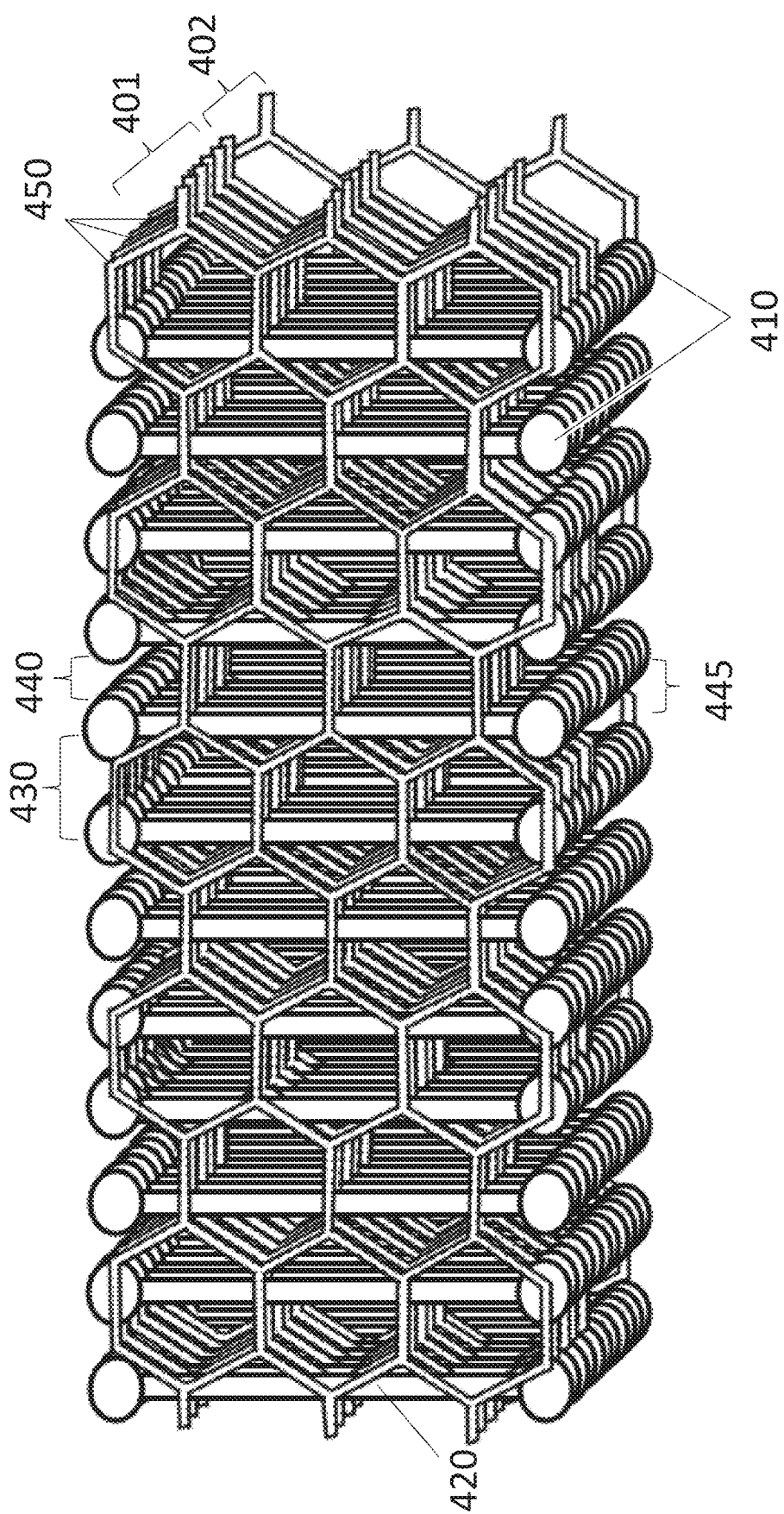
FIG. 4C illustrates a perspective view of a 3D printed design according to one embodiment of the present invention.

FIGS. 4A-4C illustrate a top view of a 3D printed design structure according to one embodiment of the present invention. The bead 410 is formed at both ends of the transverse filament 420. The channel 430 includes layered transverse filaments 420. The layered filaments 420 are bonded to an infill layer 450. The beads 410 formed on the product surface of the mold create a product surface pores 440, 445 at the ends of the channel 430 formed by the layered transverse filaments 420. FIG. 4B further depicts an external infill layer 455 within an infill density that is greater than the infill density of the infill layers 450 of the interior matrix. In one embodiment, the infill density of one or more external infill layers is greater than the infill density of the internal infill layers. FIG. 4C depicts a mold with a combination of layer densities, where one section comprises a layer of multiple transverse filaments between infill structure layers, and another section comprises a 1:1 ratio of infill layer to transverse filaments. Notably, the orientation of the structure of FIGS. 4A-4C depict the horizontal product surface of the mold formed by the infill layer and the vertical product surface of the mold formed by the beads. In the additive manufacturing process, the vertical product surface is vertically oriented while the horizontal product surface is oriented on a horizontal or para-horizontal plane.

In one embodiment, beaded filaments are bonded to an exterior layer of the infill structure to form at least a portion of the product surface, as depicted in FIG. 4B. The beads formed at one or both ends of the filaments create a product surface pore opening on the product surface of the mold as disclosed herein. In this way, the system of the present invention is operable to tailor the 3D printed mold to include additional product surfaces, as the beaded filaments applied to an exterior surface of the infill structure are operable to be placed with a high degree of specificity to the product surface. The beaded end or ends of the filament create a product surface pore to prevent the ingress of fibers. The pore (i.e., the product surface pore or the back surface pore) is narrow in comparison to the width of a channel formed by transverse filaments. Thus, the narrow opening formed by the beaded filaments comprises a section of the product surface. In one embodiment, the product surface is formed by both the beaded ends of the transverse filaments at surfaces extending in a vertical direction and an exterior layer of the infill structure at a horizontal surface. In one embodiment, the cells of the layered internal infill structure have identical apertures and do not determine the width of the channels of the present invention.

In one embodiment, the beads are connected along the product surface of the mold. In one embodiment, the beads are connected by molding each bead to the adjacent beads in a row of beads. In one embodiment, the beads are connected by fusing each bead to the adjacent beads. In one embodiment, the beads are connected by a transverse filament deposited along a row of beads which molds to the beads in a row. In one embodiment, the beads are connected by a transverse filament deposited along a row of beads which molds to the beads in a row, while columnar beads are molded to the adjacent beads in a column. In one embodiment, the beads are connected by a transverse filament deposited along a column of beads which molds to the beads in a column, while laterally adjacent beads are molded to the adjacent beads in a column.

Figure 5:
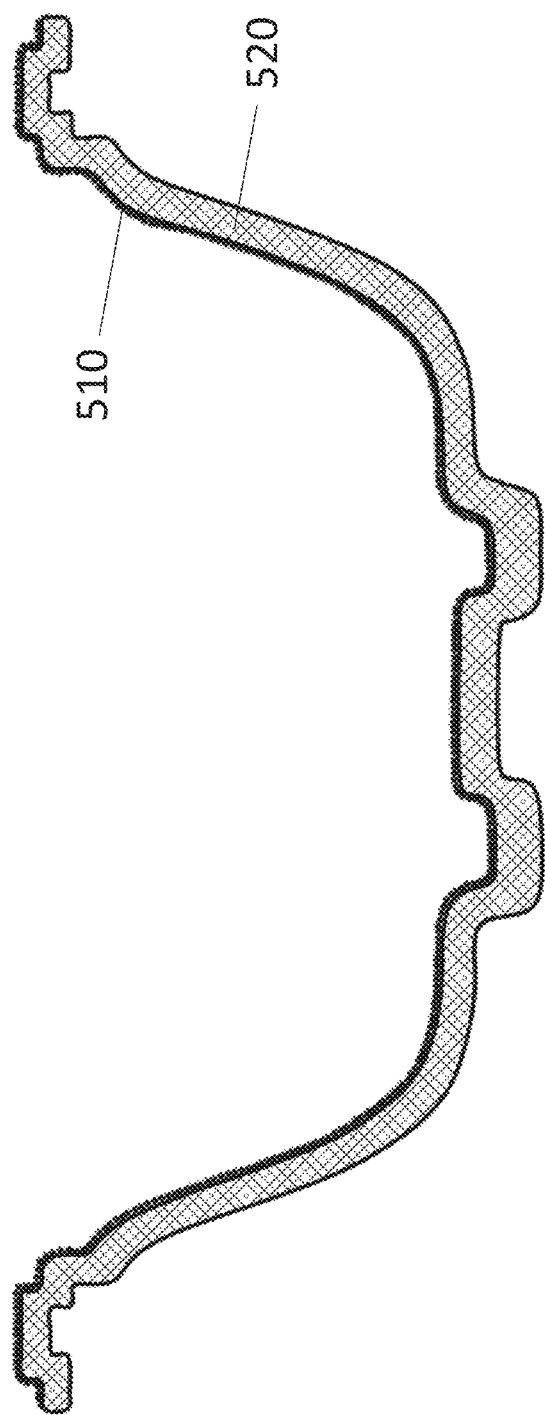
FIG. 5 illustrates a mold according to one embodiment of the present invention.

FIG. 5 illustrates a mold according to one embodiment of the present invention. The beaded product surface 510 filters the fibers from the pulp slurry as the remainder of the slurry is vacuumed out through the matrix 520 of the mold. One of ordinary skill in the art will appreciate that matrix as used herein refers to the infill structure and transverse filaments that comprise the interior of the mold. The product surface 510 comprises vertical sections that are formed by subsequent layers of beads with a pore being defined by two neighboring beads and horizontal sections that are formed by grid-like printed external infill structures.

In the vacuum forming process of 3D molded pulp products, an aqueous pulp slurry is applied to the product surface of the mold (e.g., by submersion of the mold into a vat of the slurry or injection of the slurry into the mold). The open cell configuration of the infill structure and the discontinuous filaments allows negative pressure (i.e., vacuum suction) to be applied to the slurry through the mold. As the suction is applied, the pulp fibers are vacuumed against the product surface of the mold. The product surface pores formed by the bead array and the pores (i.e., cells) of the external infill structure of the product surface prevents the fibers from entering into the channel of the mold, while the layered infill structure and the internal stacks formed by the superposed transverse filaments support the integrity of the mold and direct the vacuumed material away from the product surface with the aggregated fiber during the process. In one embodiment, the pulp slurry is injected into the mold. In one embodiment, the mold is either partially submerged (i.e., a fraction of the mold) or wholly submerged (i.e., the entire mold) in the pulp slurry. One of ordinary skill in the art will appreciate the variety of mechanisms by which the present invention is operable to be used in vacuum formation. In one embodiment, the mold is placed in a recess of a vacuum chamber and the vacuum pressure is applied through the vacuum chamber to the back surface of the mold. In one embodiment, the mold is fixed to a vacuum system and vacuum pressure is applied to the mold through the vacuum system.

In one embodiment, the product surfaces of the mold are configured at 90-degree offsets such that the horizontal product surface and the vertical product surface of the mold form a 90-degree angle at their intersection. In one embodiment, the horizontal product surface and the vertical product surface of the mold form an angle between 10 degrees to about 170 degrees at their intersection.

Figure 6:
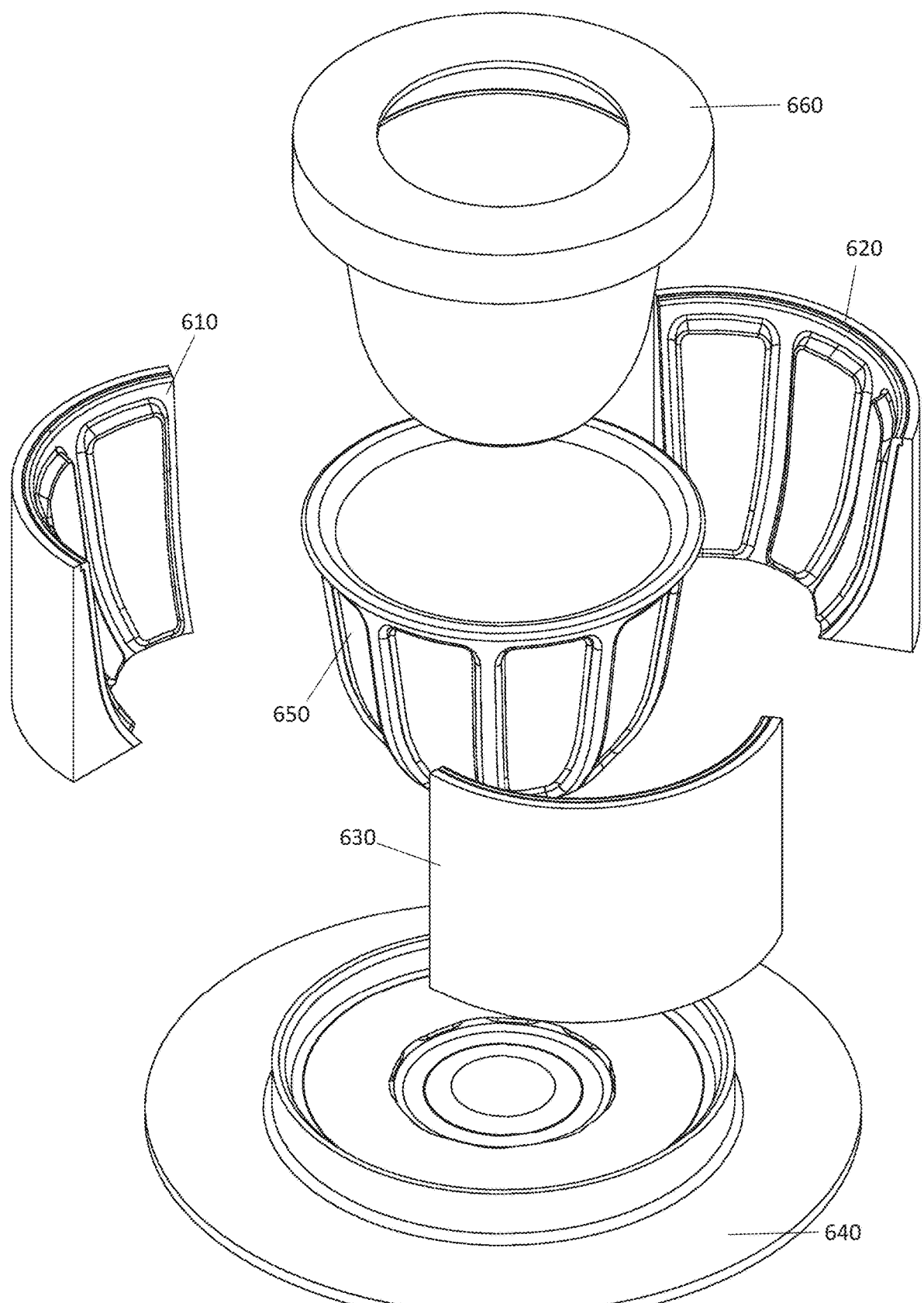
FIG. 6 illustrates a perspective view of a compound mold according to one embodiment of the present invention.

FIG. 6 illustrates a compound mold according to one embodiment of the present invention. The partial mold components 610, 620, 630 are configured to connect, forming a continuous mold surface (i.e., a product surface) when placed on the base 640. The molded fiber product 650 is vacuum formed using the compound mold and pressed by the insert 660.

The term "compound mold" as used herein refers to a mold comprising multiple partial mold components. While the partial molds are connected to form the compound mold, each partial mold is operable to include complex shapes (i.e., shapes with irregular surfaces and/or angles). Using the compound mold formed by the partial mold components, it is possible to manufacture complex, 3D products which have protrusions, undercuts, corners, edges, ridges, and imprints. By separating the partial molds, products with these features, in particular these undercuts, are operable to be released from the compound mold. Products formed using a single mold are not operable to include many of these complex features, at least in part because a single mold cannot be deconstructed to release a molded product. In one embodiment, the 3D printed mold design of the present invention is incorporated into one or more partial mold components. In one embodiment, the mold of the present invention is a compound mold comprising 3D printed partial mold components according to one embodiment of the present invention. In one embodiment, the 3D printed compound mold is that of the mold described in German Patent Pub. No. 102019120854, incorporated herein by reference in its entirety.

The partial mold components of the present invention are connected by means of at least one connecting element. In one embodiment, the connecting element connects a plurality of partial molds to a base. In one embodiment, the connecting element is used to connect at least one partial mold component to the base. In one embodiment, the connecting element secures the plurality of partial molds together. The connecting element stabilizes both the compound mold and the base by securing the partial mold components to the base, thereby preventing the mold components from shifting during vacuum formation of 3D products. In one embodiment, the connecting element is a clamp which surrounds the compound mold when the partial mold components are combined. The clamp is then closed, securing the partial mold components together. In one embodiment, the connecting element is a clamping collar affixed to the base, and the partial molds are combined and pressed into the clamping collar. In one embodiment, the connecting element is a cup into which the partial mold components are placed. In one embodiment, the bottom of the cup forms the base of the mold. In one embodiment, the connecting element is formed using a 3D printing process (e.g., the process of the present invention). In one embodiment, the connecting element comprises metal (e.g., aluminum) or plastic. In one embodiment, the connecting element is one or more projections that are configured to interlock with a corresponding recess (e.g., a projection of one partial mold component is configured to interlock with a recess of an adjacent partial mold). In one embodiment, the connecting element is one or more buckles, clips, catches, buttons, or temporary welds. In one embodiment, the connecting element is one or more pins attached to one partial mold component and extending into pin holes of a second partial mold component. In one embodiment, the molded parts are designed to interlock upon the application of negative pressure to the compound mold.

Figure 7:
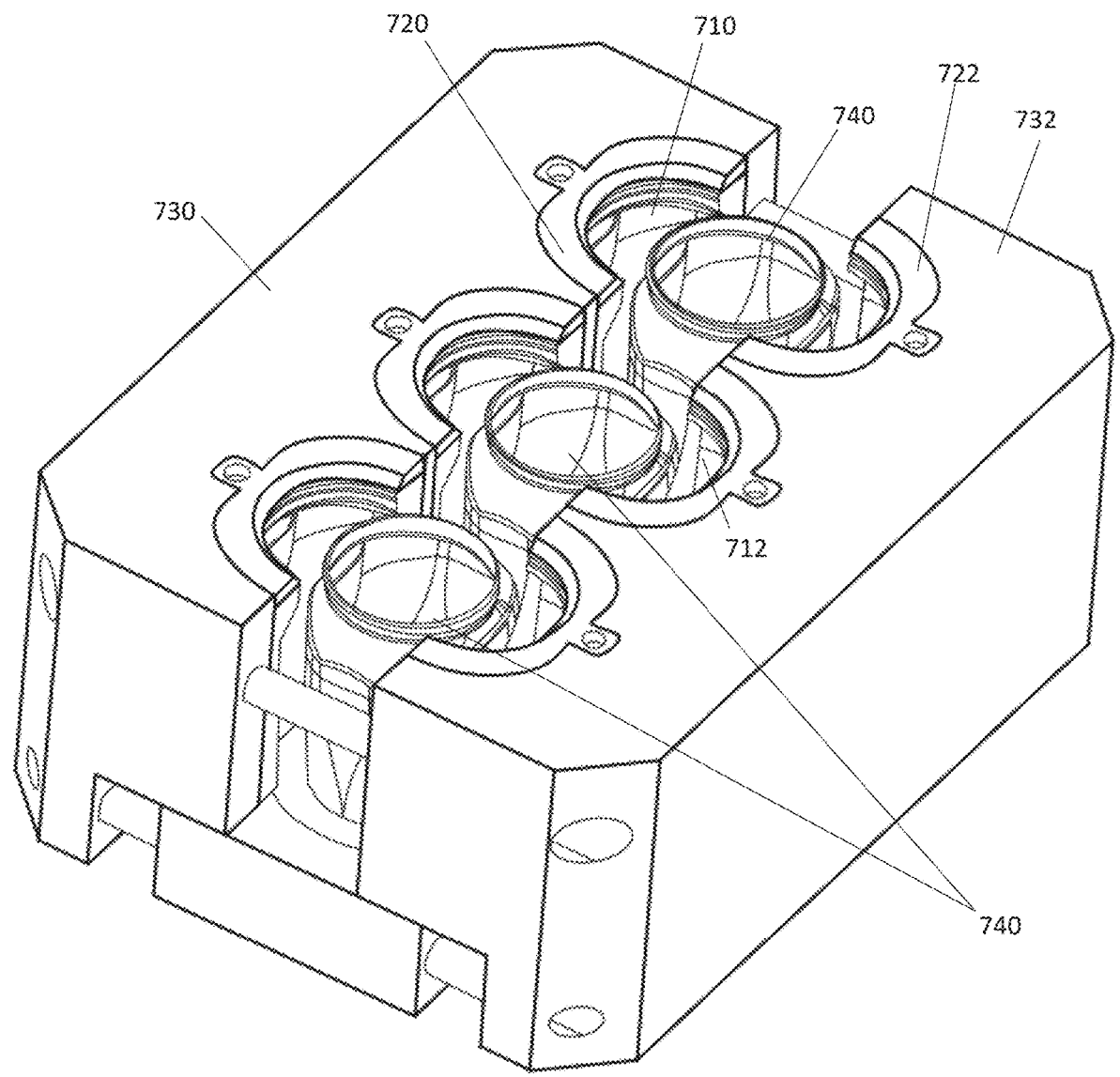
FIG. 7 illustrates a perspective view of a multi-part mold according to one embodiment of the present invention.

FIG. 7 illustrates a perspective view of a multipart mold according to one embodiment of the present invention. A 3D printed partial mold 710, 712 is fixed to a vacuum block 730, 732 and secured by a fastener rim 720, 722. Multiple 3D products 740 are formed using the multipart mold.

In order to meet increased demands for 3D pulp products, the mold of the present invention is operable to be affixed to a vacuum block for simultaneous production of multiple 3D products. In one embodiment, the vacuum block includes two halves of a 3D printed mold. The vacuum block includes two hydraulic halves which a separable, allowing for the two affixed mold halves to join and be separated as the vacuum block halves are joined and separated. To form multiple pulp products using this multipart mold, the two halves are joined, and the complete molds are formed by the joined halves. A pulp slurry is applied to the interior of the molds, and vacuum pressure is applied to the slurry through the 3D printed mold via the vacuum block. When the formation step is complete, the two halves of the mold separate the 3D products which have been formed are operable to be removed. In one embodiment, the products are heated, pressed, and or dried while in the multipart mold, before the vacuum block separates. This allows for more rapid formation of pulp products and the formation of pulp products with thin walls. Traditional methods of vacuum forming do not enable the drying of the product within the mold, requiring the shape to have a certain thickness to provide strength when removing the fragile, wet product. However, the drying of the product within the mold eliminates the need for a minimum thickness of the product to withstand handling, as the product is not handled until it is fully dried. Thus, the mold of the present invention is useful for combination with such systems to allow for the creation of 3D pulp products.

In one embodiment, individual vacuum blocks are configured with an individual vacuum system such that the multipart mold system includes at least two vacuum systems. In one embodiment, identical partial molds are secured to individual vacuum blocks which applies negative pressure to only the partial mold which is fastened to the vacuum block. Each vacuum block is configured to apply an identical force of negative pressure to the partial mold for an identical duration of time to form a product with uniform integrity. In one embodiment, the partial molds secured to each vacuum block are not identical. The vacuum blocks are then configured to apply either a dissimilar force of negative pressure to the partial mold for an identical duration of time or an identical force of negative pressure for dissimilar amounts of time to form a product with uniform integrity. In one embodiment, multiple vacuum blocks are operable to implement the same vacuum system such that when the blocks are sealed together, a single vacuum system is used to vacuum form the product.

The present invention provides for a tooling that allows for drying to occur within the mold. The drying of a molded fiber article within the mold allows for the production of thin-walled articles, as the wet, freshly-molded article is not required to be moved after formation before drying can occur, as in the case of various prior art. Rather, the article is molded within the mold of the present invention to produce molded fiber articles with a thickness between 0.01 mm and 1 mm. In addition, filigree contours of molded fiber articles are produced during drying with the flowing air. The air presses the fibers against the screen of the product surface of the mold and finely reshapes them. The systems of the prior art are not configured to produce thread flanks without direction-controlled drying, which is only enabled by using a mold capable of both forming and drying an article, as in the case of the present invention.

In one embodiment, the 3D printing methods of the present invention utilize melted material to form the beads, filaments, infill structure, protrusions, recesses, and/or other connecting mechanisms. In one embodiment, the 3D printing methods of the present invention utilizes melted material to form the beads, filaments, and infill structure, while the protrusions, recesses, and/or other connecting mechanisms are not 3D printed. In one embodiment, the melted materials used to create the printed components includes a biodegradable material such as a biodegradable thermoplastic polymer or a natural fiber polymer composite (NFPC). Examples of materials operable to be used to create the printed components include but are not limited to; biodegradable thermoplastics such as thermoplastic starch-based plastics (TPS), polyhydroxyalkanoates (PHA), polylactic acid (PLA), polybutylene succinate (PBS), or polycaprolactone (PCL); a biodegradable thermoplastic resin such as biobased polyethylene (PE), biobased polyethylene terephthalate (PET), biobased technical performance polymers (e.g., numerous polyamides (PA), or partially biobased polyurethanes (PUR); natural fiber-based compositions (e.g., NFPC) derived from plants such as hemp, flax, jute, wood, lignocellulosic plant fibers, bamboo, or sweetgrass or any combination thereof. In one embodiment, the melted material used to create the printed components is acrylonitrile butadiene styrene (ABS), polylactic acid (PLA), polyethylene terephthalate glycol (PETG), Nylon, thermoplastic polyurethane (TPU), polyvinyl alcohol (PVA), high impact polystyrene (HIPS), carbon fiber, Kevlar, fiberglass, resin, aluminum, stainless steel, tool steel, titanium, a nickel alloy, or any combination thereof.

One of ordinary skill in the art will appreciate that the threshold temperature of the mold is determined in part by the material used to print the mold. In one embodiment, the vacuum is configured to withstand a temperature up to 200° C. In one embodiment, the vacuum is configured to withstand a temperature up to 300° C. In one embodiment, the vacuum is configured to withstand a temperature up to 500° C.

Figure 8:
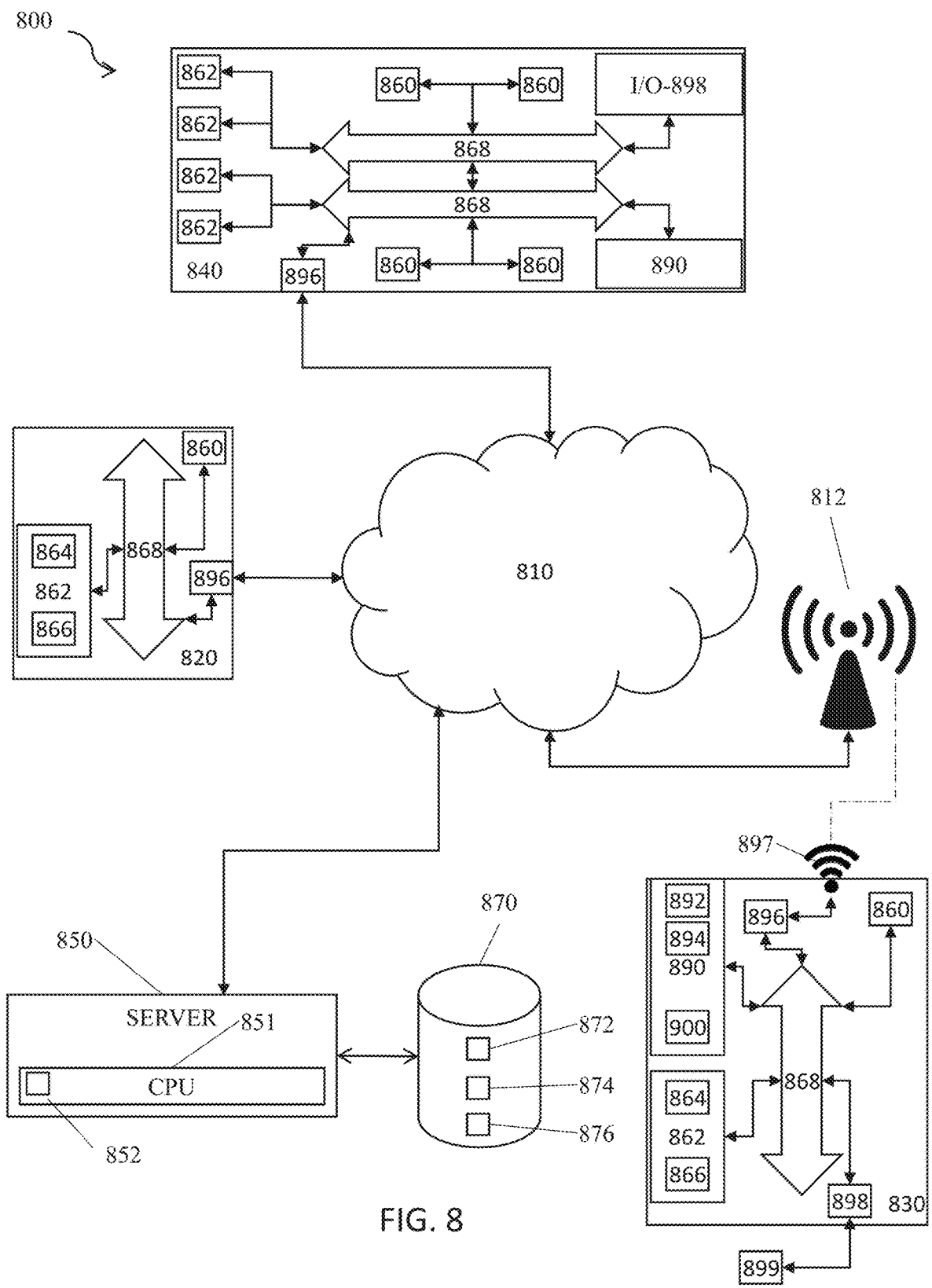
FIG. 8 is a schematic diagram of a system of the present invention.

The present invention includes an additive manufacturing process wherein a 3D printer is used to print a mold as disclosed herein. In one embodiment, the 3D printing process includes a user device receiving one or more input designs to be 3D printed and transmitting the one or more designs to a 3D printer (e.g., wireless transmission). FIG. 8 is a schematic diagram of an embodiment of the invention illustrating a computer system for controlling the 3D printing process, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 8, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 8, is operable to include other components that are not explicitly shown in FIG. 8, or is operable to utilize an architecture completely different than that shown in FIG. 8. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:
1. A mold created using additive manufacturing techniques, comprising:
   a product surface and an interior matrix;
   at least one transverse polymer layer;
   at least one infill polymer layer; and
   at least one bead;
   wherein the at least one bead comprises over extruded filament;
   wherein the at least one transverse polymer layer comprises a plurality of adjacent columns of superimposed filaments;
   wherein the superimposed filaments are configured to include a bead at one or both ends of the superimposed filaments;
   wherein the superimposed filaments are deposited discontinuously in either a unidirectional manner or a bidirectional manner, wherein at least one channel is formed between adjacent columns of discontinuous superimposed filaments;
   wherein the at least one bead is purposefully placed as an over extrusion at a product surface facing at least one end of each of the superimposed filaments to reduce decrease the size of at least one channel opening to form at least one pore on the product surface of the mold;
   wherein the product surface of the mold comprises a plurality of pores formed between beads of adjacent columns of superimposed filaments, wherein the pores are configured to prevent the ingress of a fiber into the interior matrix of the mold, wherein the at least one channel is operable to permit an invasive fiber to pass through the at least one channel without obstruction; and
   wherein an infill polymer layer is deposited on the at least one transverse polymer layer.

2. The mold of claim 1, wherein the at least one transverse polymer layer and the at least one infill polymer layer comprise at least one component selected from the group consisting of a biodegradable thermoplastic polymer, a natural fiber polymer composite (NFPC), polylactic acid (PLA), polycarbonate (PC), acrylonitrile butadiene styrene (ABS), polyethylene terephthalate glycol (PETG), and nylon.

3. The mold of claim 1, wherein the at least one infill polymer layer is a honeycomb pattern, a grid pattern, a cubic pattern, an octet pattern, a triangle pattern, a tri-hexagon pattern, a line pattern, a gyroid pattern, a zig zag pattern, a cross pattern, or a concentric pattern.

4. The mold of claim 1, wherein the at least one transverse polymer layer is about 1 mm thick.

5. The mold of claim 1, wherein at least one additional transverse polymer layer is deposited on top of the infill layer, wherein at least one additional infill layer is deposited on top of the at least one additional transverse polymer layer.

6. The mold of claim 1, wherein the interior matrix is wider than the plurality of pores of the product surface of the mold.

7. The mold of claim 1, wherein the at least one transverse polymer layer is not tapered.

8. The mold of claim 1, wherein the at least on infill layer forms at least a portion of the product surface, wherein at least one additional bead is extruded on the at least one infill layer.

9. The mold of claim 1, wherein the application of vacuum suction to the mold allows negative pressure to travel through the interior matrix of the mold to the product surface.

\* \* \* \* \*